US006375072B2

(12) United States Patent
Watari et al.

(10) Patent No.: US 6,375,072 B2
(45) **Date of Patent: *Apr. 23, 2002**

(54) CARRIER UNIT FOR FEEDING TRANSACTION MEDIUM TO DESIRED LOCATION AND AUTOMATIC TRANSACTION SYSTEM HAVING THE CARRIER UNIT

(75) Inventors: Kazushi Watari, Yokohama; Kouji Iguchi, Inagi, both of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,271

(22) Filed: Dec. 8, 1998

(30) Foreign Application Priority Data

Feb. 17, 1998 (JP) .......................................... 10-035155

(51) Int. Cl.[7] ................................................ G06F 17/60

(52) U.S. Cl. ........................... 235/379; 235/475; 271/3

(58) Field of Search ................................ 235/379, 380, 235/381, 383, 475, 482, 486; 902/8, 11, 12, 14, 30, 24; 271/3, 4; 705/41, 43, 44

(56) References Cited

U.S. PATENT DOCUMENTS

| | | | | | |
|---|---|---|---|---|---|
| 4,595,828 | A | | 6/1986 | Lundblad | 235/379 |
| 4,628,192 | A | | 12/1986 | Suzuki | 235/1 R |
| 4,883,183 | A | * | 11/1989 | Kimura et al. | 235/379 |
| 5,020,787 | A | * | 6/1991 | Arikawa | 271/3 |
| 5,183,142 | A | * | 2/1993 | Latchinian et al. | 235/381 |
| 5,513,773 | A | * | 5/1996 | Cargill | 221/231 |
| 6,027,025 | A | * | 2/2000 | Postrel et al. | 235/486 |

FOREIGN PATENT DOCUMENTS

| | | |
|---|---|---|
| JP | 61 060549 | 3/1986 |
| JP | 07 137883 | 5/1995 |

* cited by examiner

*Primary Examiner*—Michael G. Lee
*Assistant Examiner*—Daniel St. Cyr
(74) *Attorney, Agent, or Firm*—Armstrong, Westerman & Hattori, LLP

(57) ABSTRACT

When a through-the-wall ATM which is expected to be installed into a wall having a thickness of 6 inches or so, is attempted to be installed into a relatively thick wall having a thickness of 13 inches or so, a carrier unit is attached to a BDU, a EDU, and so on in the ATM to carry bills and deposit envelopes. This carrier unit enables the facade of the ATM to be separated from the BDU, etc., by a desired distance, and provides the ATM with an improved operability.

12 Claims, 16 Drawing Sheets

CARRIER UNIT FOR FEEDING TRANSACTION MEDIUM TO DESIRED LOCATION AND AUTOMATIC TRANSACTION SYSTEM HAVING THE CARRIER UNIT

BACKGROUND OF THE INVENTION

The present invention relates generally to carrier units for feeding a transaction medium to a desired location and automatic transaction systems having the carrier units, and more particularly to a carrier unit for feeding a transaction medium in accordance with transaction information from an operation part to a processor part or an output part to a desired location (for example, the operation part) in a transaction system which locates the processor part and/or the output part apart from the operation part, and a transaction system having such a carrier unit.

The carrier unit of the present invention is advantageously applicable to an carrier unit which connects a dispensing outlet or a receiving inlet of a bill dispense unit (BDU), a bill recycle unit (BRU) or an envelope depository unit (EDU) to a facade in a conventional through-the-wall automatic teller machine (ATM), cash dispenser (CD), and automatic depository (AD) which are manufactured to be compatible with approximately 6-inch thick wall, when such an ATM, CD and AD are attempted to be installed in a thick wall having an approximately 13-inch thickness.

Hereupon, the BDUs are those units dedicated to withdrawal which dispense bills corresponding to the amount to be withdrawn when a user enters predetermined transaction information, such as card data, his/her PIN, and the amount to be withdrawn. The BRUs are depositing/withdrawing units which enable a user to not only deposit but also withdraw money through entry of the predetermined transaction information. The BRUs inspect the deposited bills and reuse them. The EDUs are units dedicated to deposit which process the amount to be deposited when a user envelops bill(s) and puts the envelope in the unit with entry of the predetermined transaction information.

The automatic transaction systems (or apparatuses) are those which accept and/or dispense one or more transaction media (such as bills, coins, cards, train tickets, entry tickets, securities, e.g., stock certificates, pari-mutuel tickets, lottery tickets, vouchers, slips, merchandise, diagnosis appointment cards) in accordance with the predetermined transaction information entered by a user. The automatic transaction systems therefore broadly cover automatic money loan machines, automatic card issue units, automatic bankbook output machines, etc., and the most typical type is an ATM installed at banks and other financial institutions.

Among various types of ATMs, a through-the-wall ATM has a facade (or a front cover) exposed outside the wall through which a user performs various transaction operations and inserts a card and a bankbook. The remaining part (or a housing body) accommodated inside the wall. The through-the-wall ATM works, when embedded into a building wall, for example, as a drive-through ATM.

The through-the-wall ATM usually has an approximately rectangular parallelepiped housing, and its facade is arranged parallel to the vertical surface of the housing. The housing accommodates a BDU and/or an EDU, or a BRU. A description will be given of a case where the housing has a BDU and an EDU. Attempting to withdraw money, a user manipulates the facade, inserts a card into it, and enters the predetermined transaction information, such as his/her PIN and the amount to be withdrawn. If the ATM (main controller) judges the transaction information to be correct based on a communication with a host computer, then it takes bills corresponding to the withdrawal amount from the BDU, and dispenses the bills from a bill dispensing outlet in the facade through a BDU bill dispensing part.

On the other hand, attempting to deposit money, a user manipulates the facade, inserts a card into it, and enters the predetermined transaction information, such as his/her PIN. If the ATM judges the transaction information to be correct based on the communication with the host computer, then it guides the user to envelop the bill(s) to be deposited and insert the envelope into an envelope inlet in the facade. The inserted envelope is received by an EDU body through an EDU envelope receiving part, printed with predetermined information, and accommodated in an EDU storage part.

The BDU bill dispensing part and the EDU envelope receiving part both project from the housing by approximately 6 inches in the neighborhood of facade's bill dispensing outlet and envelope inlet which are respectively closed by shutters.

Thus, the prior art BDU dispensing part and EDU receiving part project from the housing by 6 inches towards the facade into the wall. This is because the Japanese financial institutions which install these through-the-wall ATMs have traditionally about 6-inch thick wall. As readily understood, when the wall has a thickness less than 6 inches, the facade projects from the wall surface.

However, ATMs will be likely to be installed in various locations hereafter due to the financial big bang, and these installation spots do not always have a wall with 6 inches or less. Internationally, it is not surprising that installation spots have a 13-inch or thicker wall, for example, in Europe.

When the 6-inch thick wall compatible through-the-wall ATM is sited in a 13-inch or thicker wall, the facade retreats from the user's standing position (or wall surface) by 7 inches or longer towards the inside of the wall.

The facade located in such a concave of the wall is separated far from the user, providing bad operability: for example, it is inconvenient to take out bills from the bill dispensing outlet and insert an envelope into the envelope inlet. In addition, the sequestered facade is disadvantageously ill-lit and too dark to be operated smoothly at night.

It is conceivable to plane the wall under the facade so that a user can approach the facade, but this arduous solution is not so practical in light of cost. It is also conceivable to manufacture custom-made EDUs and BDUs with different projection lengths so as to match thickness of installation walls, but this is inefficient for manufacturing purposes.

BRIEF SUMMARY OF THE INVENTION

Accordingly, it is a general object of the present invention to provide a novel and useful carrier unit and automatic transaction system having the carrier unit in which the above disadvantages are eliminated.

It is another object of the present invention to inexpensively and efficiently feed a transaction medium from a processing unit to a desired location apart from the processing unit and or from an input part to a processor unit apart from the input part.

It is still another object of the present invention to provide through-the-wall ATMs which can be compatible inexpensively and efficiently with thick walls having thickness of 13 inches or more, without changing basic designs of BDUs, EDUs, and etc. which were manufactured so as to be compatible with 6-inch thick walls that are universally accepted in the current Japanese financial institutions In order to achieve the above objects, a carrier unit of the present invention includes a transaction medium receiving part which receives a transaction medium from a dispensing part of a processing unit in an automatic transaction system the processing unit including the dispensing part, the automatic transaction system, including an input part and the processing unit, the dispensing part dispensing the transaction medium in accordance with transaction information entered from the input part, and a feed system which feeds the transaction medium from the dispensing part of the processing unit, outward to the processing unit to a predetermined location apart from the dispensing part by a predetermined distance.

Another carrier unit of the present invention includes a transaction medium receiving part which receives a transaction medium from an input part of an automatic transaction system including the input part and a processing unit, the processing unit including a processing part and an entry part, the entry part being located apart from the input part, the processing part conducting a predetermined process for the transaction medium entered from the input part through the entry part, and a feed system which feeds the transaction medium from the input part to the entry part of the processing unit in the automatic transaction system.

An automatic transaction system of the present invention includes an input part for entering transaction information and receiving a transaction medium in accordance with the transaction information, a processing unit which processes the transaction information and dispenses the transaction medium, the processing unit including a dispensing part to dispense the transaction medium and a carrier unit which is connected to the dispensing part and feeds the transaction medium from the dispensing part to the input part, enabling the input part to be located apart from the dispensing part.

A carrier control method of the present invention for feeding a transaction medium from a dispensing part of a processing unit to an input part via a carrier unit in an automatic transaction system which includes the input part, the processing unit apart from the input part, and the carrier unit, the processing unit including the dispensing part and a processing part, the transaction medium being determined by the processing part based on transaction information entered from the input part, includes driving the carrier unit so as to send out the transaction medium from the dispensing part of the processing unit to the carrier unit, measuring a feeding period of time for which the carrier unit feeds the transaction medium, comparing the feeding period of time with reference time, and controlling driving of the carrier unit based on a result of the comparing step.

A carrier control method of the present invention for feeding a transaction medium entered by an input part from the input part to an entry part via a carrier unit in an automatic transaction system which includes the input part, a processing unit that includes the entry part apart from the input part, and the carrier unit, includes driving the carrier unit so as to send out the transaction medium from the input part to the carrier unit, measuring a feeding period of time for which the carrier unit feeds the transaction medium, comparing the feeding period of time with reference time, and controlling driving of the carrier unit based on a result of the comparing step.

According to the present invention, the carrier unit feeds a transaction medium which has been dispensed from the dispensing part of the processing unit to a predetermined location (such as, an input part) apart from the dispensing part by a desired distance. In addition, the transaction medium entered through the input part is fed by the carrier unit to the entry part of the processing unit apart from the input part by a desired distance. The feeding period in the carrier unit is used to control to carry the transaction medium.

Other objects and further features of the present invention will become readily apparent from the following description and accompanying drawings.

DETAILED DESCRIPTION OF PREFERRED EMBODIMENTS

Figure 1:
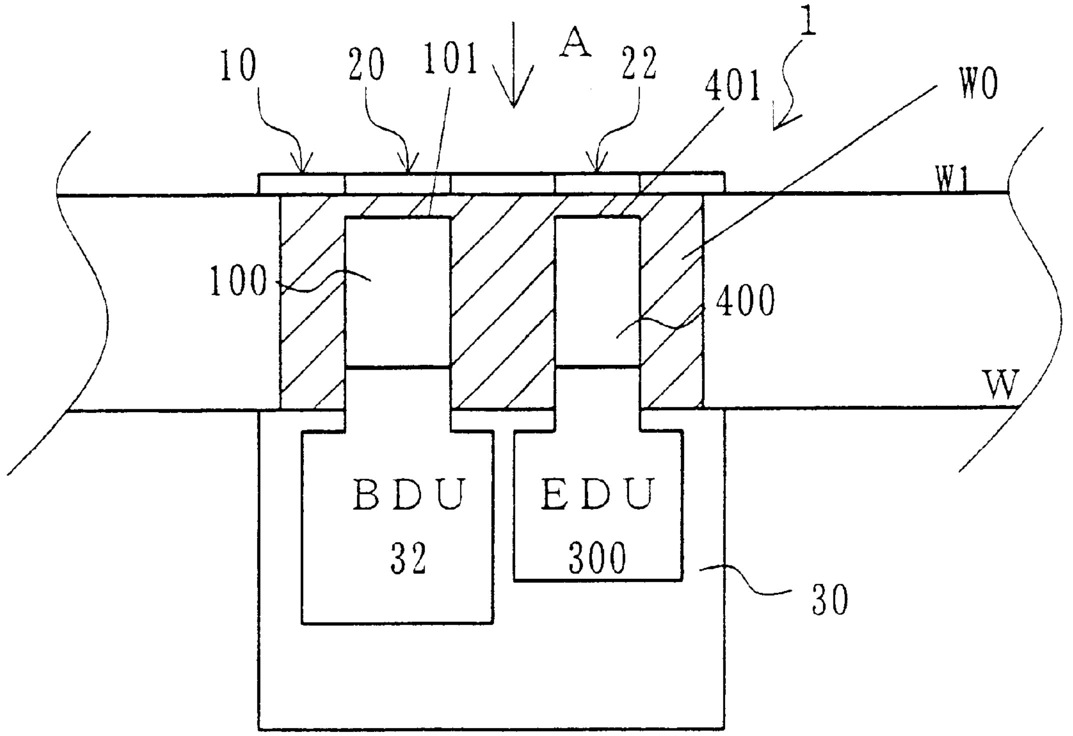
FIG. 1 is a schematic sectional view of ATM 1 of the present invention.
Figure 4:
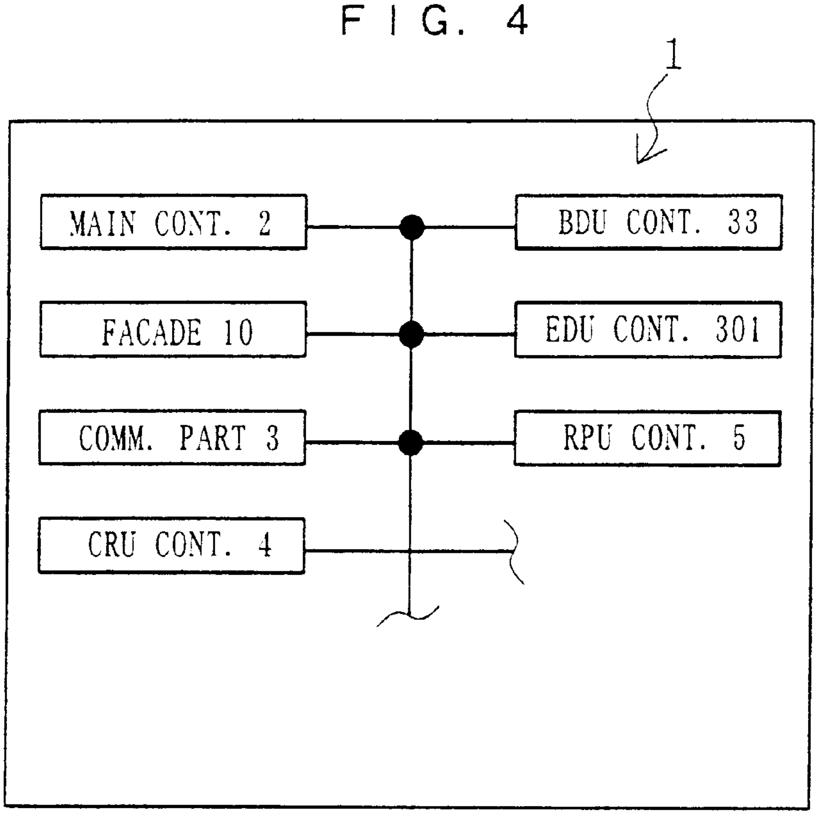
FIG. 4 is a partial block diagram of a control system of the ATM 1 shown in FIG. 1.
Figure 2:
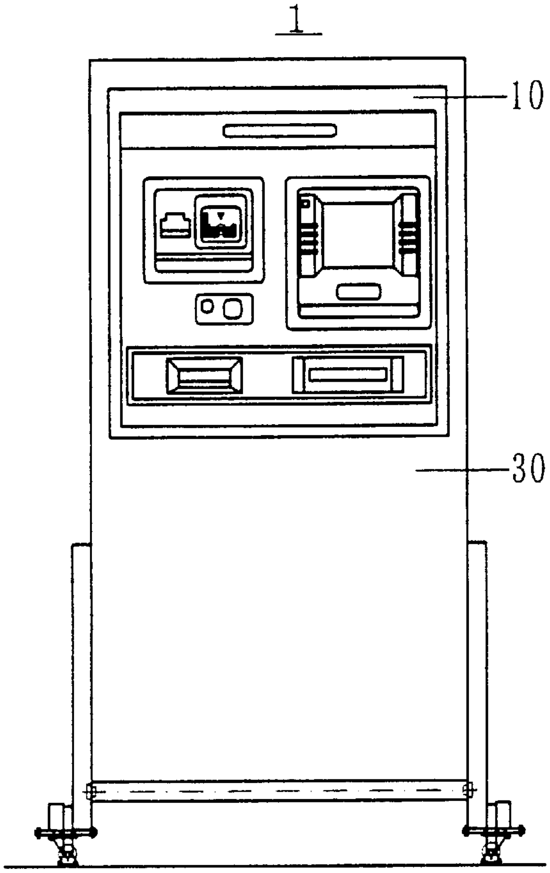
FIG. 2 shows the ATM 1 shown in FIG. 1 viewed from direction A eliminating a wall.
Figure 3:
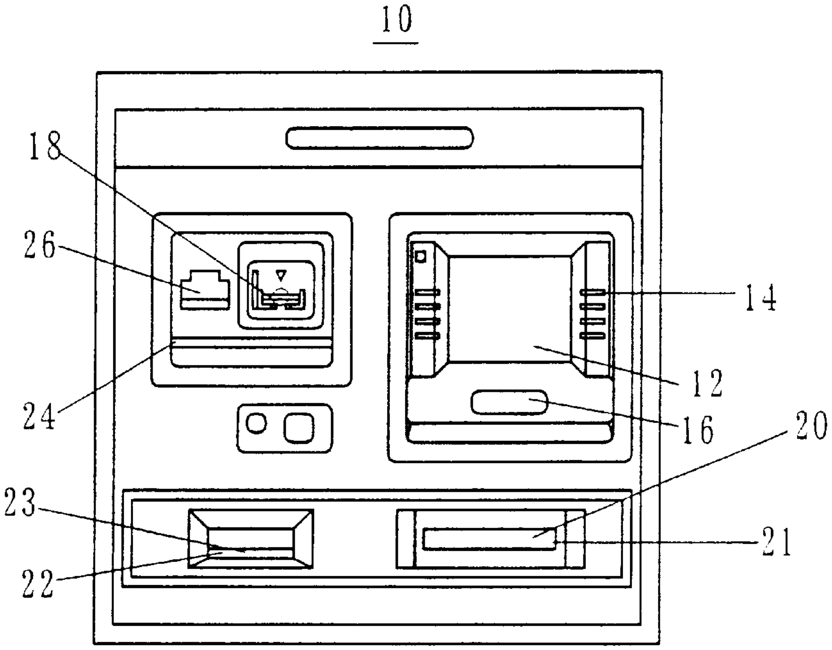
FIG. 3 is an enlarged view of facade 10 of the ATM 1 shown in FIG. 2.

Referring to the accompanying drawings, a description will be given of preferred embodiments according to the present invention using a through-the-wall ATM as an example. Hereinafter, the same and corresponding elements are designated by the same reference numerals, and a description thereof will be omitted. FIG. 1 is a schematic sectional view of ATM 1 of the present invention. FIG. 2 is a front view of the ATM 1 shown in FIG. 1 viewed from direction A. FIG. 3 is an enlarged view of facade 10 in the ATM 1 shown in FIG. 2. FIG. 4 is a partial block diagram of a control system in the ATM 1 shown in FIG. 1.

The through-the-wall ATM 1 of the present invention includes, as shown in FIG. 1, the facade 10 provided at a front surface of a relatively thick wall W having a thickness more than 13 inches; housing 30 including BDU 32 and EDU 300 provided inside the wall W; carrier unit 100, located in hollow space W0 in the wall W, which connects the BDU 32 to the facade 10; and carrier unit 400, similarly located in the inner space W0 in the wall W, which connects the EDU 300 to the facade 10. The inner wall W0 is crosshatched in FIG. 1, and approximately corresponds to a position where the facade 10 is to be attached. The wall W is perforated through the inner space W0. As described later, the ATM 1 further includes a card reader unit (CRU), a receipt printer unit (RPU), and other components (not shown) which are connected to (a rear surface of) the facade 10 in the inner space W0 above the carrier units 100 and 400.

Figure 5:
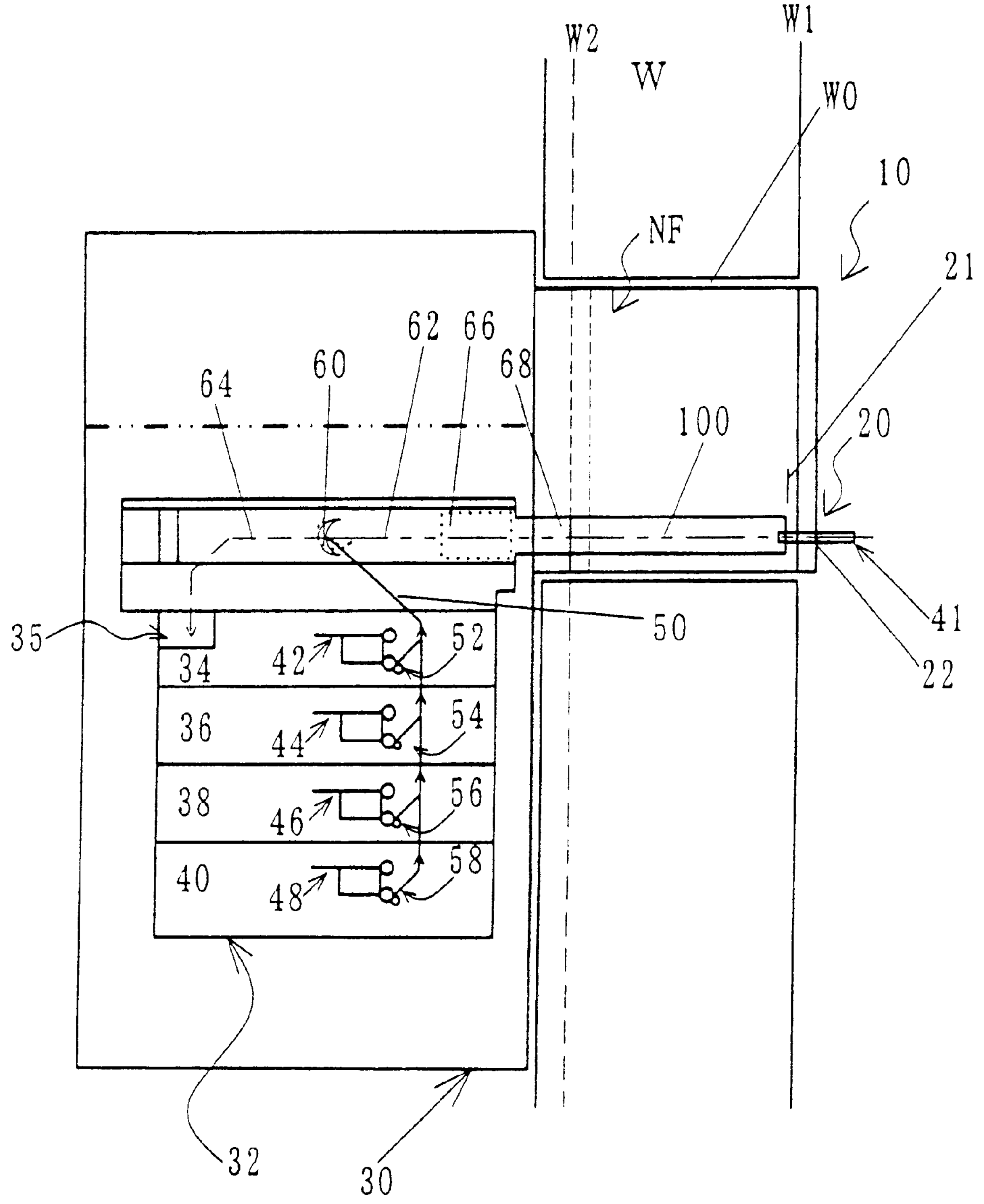
FIG. 5 is a sectional view of an essential part of the ATM 1 shown in FIG. 1 for explaining an arrangement among the facade 10, BDU 32, and carrier unit 100.

Referring FIG. 1, and FIG. 5 that will be described later, the facade 10 is attached to surface W1 of the wall W, i.e., near a standing position of a user of the ATM 1, and no members shield the facade 10. Therefore, the user may stand close to the facade 10 and manipulate it. The facade 10 may be so well-lit that the user can operate the facade 10 as easily as he/she operates, while standing close to surface W2, facade NF of the conventional through-the-wall ATM installed on the surface W2 of a relatively thin wall having a thickness of about 6 inches, as shown in FIG. 5. Thus, according to one of the characteristics of the present invention using the carrier units 100, 400 which will be described in great detail, a relationship between the position of the facade 10 and user's standing position is made equal to the relationship between the position of the facade NF of the conventional through-the-wall ATM installed in the relatively thin wall, and user's standing position. In other words, when the facade is attempted to be installed into a thick wall, the prior art requires the facade to be embedded (in the neighborhood of W2) while a user stands near the surface W1, the user is required to make a long arm for the facade at the position W2 so as to operate it. On the contrary, the present invention enables the facade which has been conventionally embedded in the surface W2, to be arranged at the surface W1, eliminating any inconvenience accompanying with operations of the facade embedded in the wall.

The facade 10 includes, as shown in FIG. 3, operation screen 12, function keys 14, keyboard 16, card inlet 18, bill dispensing outlet 20, envelope inlet 22, receipt dispensing outlet 24, and envelope stock part 26. Although FIG. 3 shows a typical facade configuration, the facade is not limited to this configuration and may use any configuration that is generally accepted.

The operation screen 12 includes a CRT display that indicates operational procedures, entered transaction information, and so on. The function keys 14 are used to select a type of transaction from among deposit, withdrawal, transferring, balance information, and so on. The keyboard 16 is used to enter a PIN and the amount to be withdrawal.

A card necessary for the transaction is supposed to be inserted into the card inlet 18, and finally ejected from the card inlet 18. The card inserted into the card inlet 18 is fed to the aforementioned CRU (not shown). The CRU is connected to and controlled by CRU controller 4 shown in FIG. 4. The CRU reads out transaction information recorded in the magnetic stripe in the card (and writes down transaction information on the magnetic stripe if necessity arises), but the structure thereof is well known in the art and therefore a detailed description thereof will be omitted.

The bill dispensing outlet 20 is opened and closed by shutter 21, and located close to the bill dispensing part 101 of the carrier unit 100 of the present invention. As described later, when the shutter 21 opens, bills partially protrude from the bill dispensing outlet 20 while partially held at the bill dispensing part 101 of the carrier unit 100. Thereby, a user may take out the projected bills. Other operations relating to the bill dispensing outlet 20 and the shutter 21 will be described later.

The envelope inlet 22 is opened and closed by shutter 23, and located close to the envelope receiving part 401 of the carrier unit 400. As described later, when the shutter 23 opens, a user may insert deposit envelope 600 into the envelope inlet 22. Thereby, the deposit envelope 600 is accommodated into the EDU 300 through the carrier unit 400. Other actions relating to the envelope inlet 22 and the shutter 23 will be described later.

The receipt dispensing outlet 24, connected to the RPU (not shown), dispenses a detailed statement of use (i.e., receipt) which indicates a result of transaction. The RPU is connected to and controlled by RPU controller 5 shown in FIG. 4. The RPU may produce the receipt, but the structure thereof is well known in the art and therefore a detailed description thereof will be omitted. Dispensing of a receipt usually takes place with returning of a card.

As described above, the CRU and RPU (not shown) are provided in the inner space W0 in the wall W, and no wall exists between the CRU and the facade 10 and between the RPU and the facade 10. Thus, in general, it is not necessary to provide the carrier unit of the present invention so as to feed a card and a receipt. In addition, the CRT display which constitutes the operation screen 12 is provided in the inner space W0 and the carrier unit does not have to be provided since the CRT display is electrically connected by the housing 30 by a cable. Nevertheless, the present invention is not precluded from using the carrier unit to connect the facade 10 and the CRU and/or RPU (not shown) if it becomes necessary to locate these components apart from the facade 10 by a considerable distance, for instance.

On the other hand, the BDU 32 and EDU 300 each require, as described later, a storage units for storing bills and envelops at lower parts thereof, which is too large to be accommodated in the aforementioned inner space W0 in the wall W. These storage units of the BDU 32 and EDU 300 should be provided inside the wall W, and necessarily separated from the facade 10 which exposes outside the wall W. As a consequence, they always require the carrier units 100 and 400.

The envelope stocks part 26 keeps a plurality of deposit envelopes in stock. A user, when attempting to place money on deposit, envelops bills into one of the deposit envelopes, and then deposits the envelope. The deposit envelope is a regular envelope that is acceptable to the EDU 300.

Referring to FIG. 1, the housing 30, located inside the wall W, accommodates the BDU 32 and the EDU 300. Since the housing 30 is positioned inside the wall W, this ATM 1 is considered to be a through-the-wall ATM.

As to the control system, the ATM 1 includes, as shown in FIG. 4, main controller 2 for the body. The main controller 2 is connected to the operation screen 12 of the facade 10 and communication part 3 which communicates with an external host computer, as well as controller 33 (not shown) of the BDU 32 and controller 301 (not shown) of the EDU 300. The main controller 2 stores host application software.

The main controller 2 may obtain an approval to the transaction and other information from the host computer 3 through the communication part 3. The host computer judges whether the PIN accords with the recorded one, whether the amount to be withdrawn is within an allowable limit, and whether any other matters are satisfied, and determines whether the transaction can be approved. Then, the host computer informs the main controller 2 of the result through the communication part 3.

The CRU controller 4 is connected to the aforementioned CRU (not shown), and controls it. The CRU controller 4 is controlled by the main controller 2. The configuration of the CRU controller 4 is well known in the art and therefore a detailed description will be omitted.

The RPU controller 5 is connected to the aforementioned RPU (not shown), and controls it. The RPU controller 5 is controlled by the main controller 2. The configuration of the CRU controller 4 is well known in the art and therefore a detailed description will be omitted.

Operations of the carrier units 100 and 400 of the present invention may be controlled respectively by changing control conditions at the controller 303 of the BDU 32 and the controller 301 at the EDU 300. Therefore, the ATM 1 of the present invention simplifies the control systems for these carrier units. These will be described in detail later.

Figure 14:
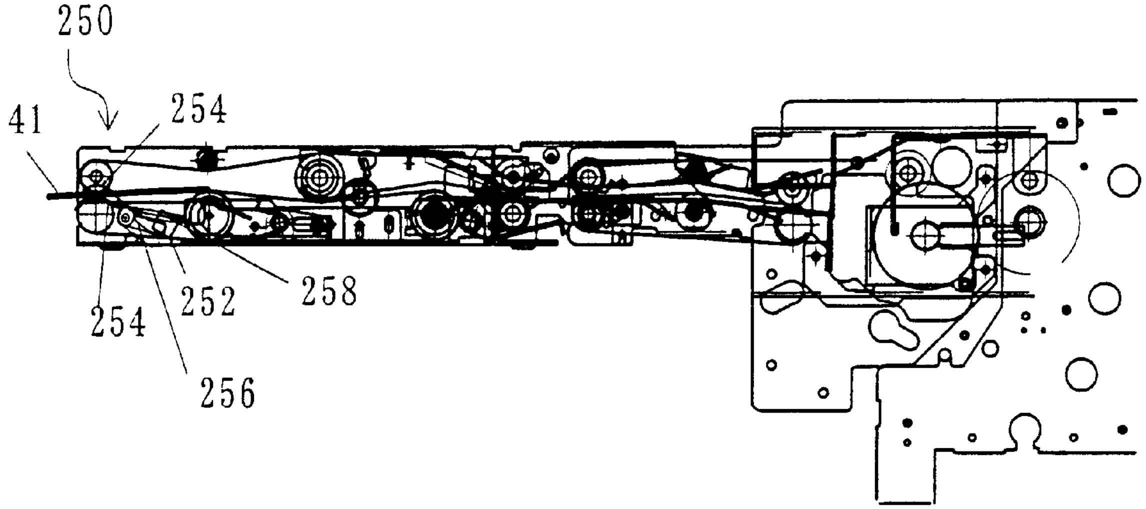
FIG. 14 is a sectional view including sensor 252 in the bill detector system 250 shown in FIG. 13.

Referring to FIGS. 5 and 14, a description will now be given of the BDU 32 and the carrier unit 100 in the ATM 1 of the present invention. FIG. 5 shows a partial sectional view of the ATM 1 for explaining an arrangement among the facade 10, the BDU 32, and the carrier unit 100.

The BDU 32 may use any BDU as it is, for example, Fujitsu CA02467-B051. Thus, the configuration of the BDU 32 is well known in the art, and therefore a structure and function of each component in the BDU 32 are simplified and partially omitted in the following description and the accompanying drawings. Each component of the BDU 32 receives instructions from the main controller 2 through the BDU controller 33.

The BDU 32 has four cassettes 34, 36, 38 and 40 which may store four different kinds of bills 42, 44, 46, and 48 (such as $1, $5, $10, and $20), sorting part 60, and bill dispensing part 68. In the following discussion, bills 41 generally represent the bills 42, 44, 46 and/or 48.

The cassettes 34, 36, 38 and 40 have draw-out mechanisms 52, 54, 56 and 58, respectively, which may draw out bills 42, 44, 46, and 48 to feed path 50. The top cassette 34 has a rejection area 35 for storing bills 41 which have been judged to be abnormal or unsuccessfully delivered.

The draw-out mechanisms 52, 54, 56 and 58 each include draw-out roller(s) and a pulse motor (not shown), and serve to draw out bills 41 one by one to the feed path 50 when the pulse motor rotates in accordance with a draw-out instruction from the main controller 2 via the controller 33.

The sorting part 60 includes a sensor (not shown) and a switching gate of the feed path 50. The sensor judges the bill(s) 41 to be normal if one paper bill 41 is drawn out and aligned with the feed path 50. When the sensor judges the bill to be normal, the switching gate switches the feed path 50 to dispensing path 62. On the other hand, the sensor judges the bill(s) 41 to be abnormal when more than two bills 41 are piled and when the bill 41 is not aligned with the feed path, e.g., slants relative to it. When the sensor judges the bills 41 to be abnormal, then the switching gate switches the feed path 50 to the rejection path 64. The dispensing path 62 is connected to pool part 66, which is illustratively enclosed by broken line, and the rejection path 64 is connected to the rejection area 35 in the cassette 34. Thereby, normal bills are stored in the pool part 66, whereas abnormal bills are stored in the rejection area 35. Even though the bill is judged to be normal and stored in the pool part 66, if the host computer does not approve the transaction because of the discordance of the PIN or any other reason, then the sorting part 60 regulates the switching gate so that the bill is fed to the rejection area 35.

The pool part 66 temporarily pools the bills 41 until it receives all the bills 41 to be dispensed and a dispensation instruction from the main controller 2. The main controller 2 issues, when receiving an approval message of the transaction from the host computer, the dispensation instruction to dispense the bills 41 to the bill dispensing outlet 20 in the facade 10. If the host computer judges that the transaction cannot be approved because of the discordance of the PIN or any other reason, then the main controller 2 issues a rejection instruction. In response, the bills 41 which have been temporarily stored in the pool part 66 are fed together to the rejection area 35 through the rejection path 64.

The bill dispensing part 68 is connected to the pool part 66, and projects by 6 inches or so towards the facade 10 from the housing 30 into the wall W. The bill dispensing part 68 feeds the bills 41 while holding the bills 41 by a pair of feed rollers, and dispenses the bills 41 toward the carrier unit 100 in response to the dispensation instruction from the main controller 2.

The carrier unit 100 is firmly secured by screw onto the BDU 32 at one end thereof, and is located at the other hand thereof (i.e., bill dispensing part 101) in the neighborhood of the bill dispensing outlet of the facade 10. In the present embodiment, the reason why the other end of the carrier unit 100 is not secured onto the facade 10 is to maintain the movement of the shutter 21. As far as the movement of the shutter 21 is maintained, the bill dispensing part 101 of the carrier unit 100 may be secured onto the facade 10. The carrier unit 100 enables the facade 10 to be separated from the BDU 32 by feeding the bills 41 from the bill dispensing part 68 of the BDU 32 to the bill dispensing outlet 20 of the facade 10.

Referring to FIGS. 6–14, a description will be given of a concrete structure of the carrier unit 100. As discussed above, the ATM 1 of the present invention is embedded into the relatively thick wall W having a thickness of about 13 inches, and the bill dispensing part 68 of the BDU 32 projects by about 6 inches into the wall W. Therefore, the carrier unit 100 is made to have a span of 7 inches or so. Since the carrier unit 100 is connected to the BDU 32, the facade 10 may be spaced apart from the BDU 32.

Figure 6:
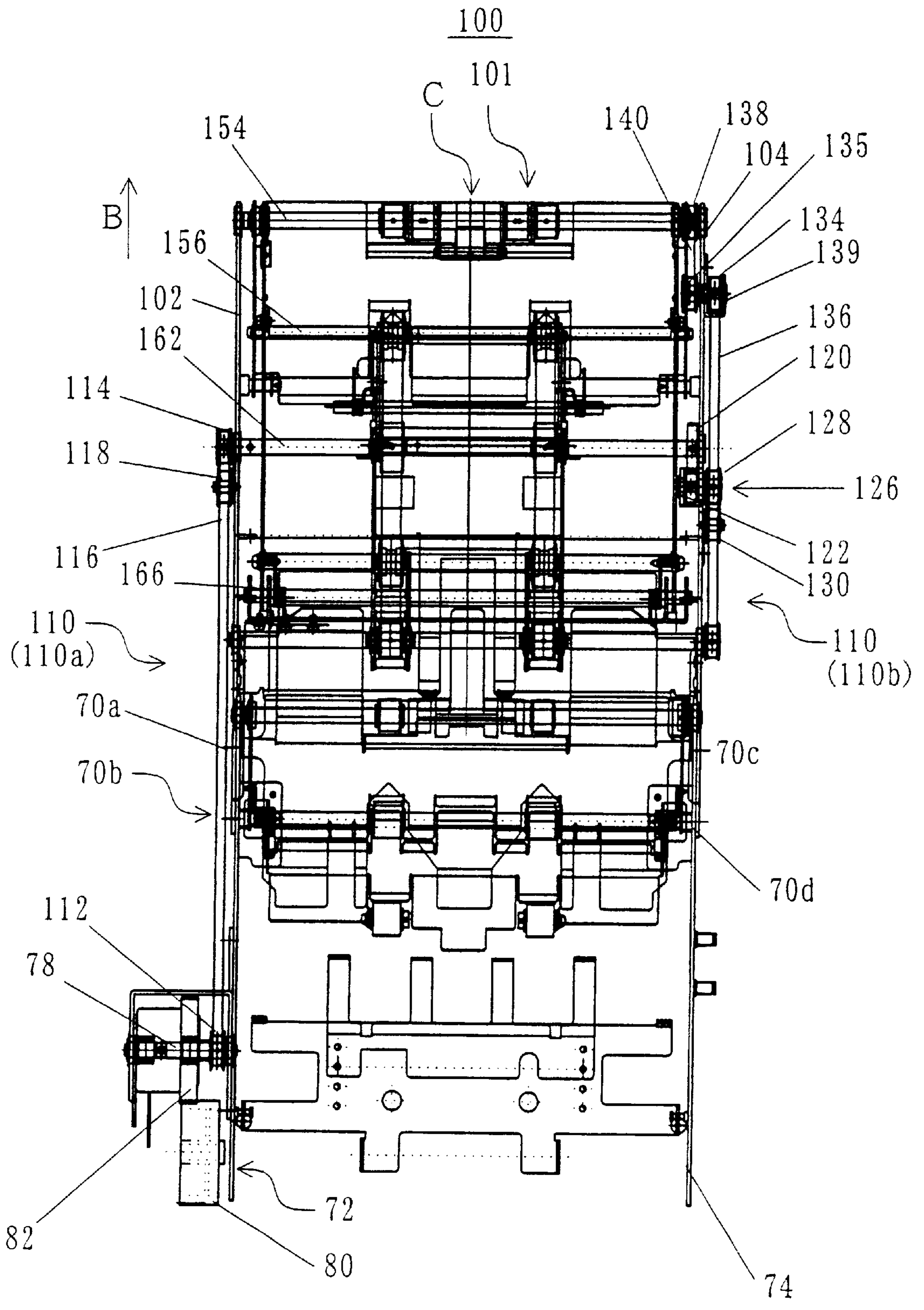
FIG. 6 is an enlarged plane view for explaining driving system 110 in the carrier unit 100 of the present invention shown in FIG. 5.
Figure 7:
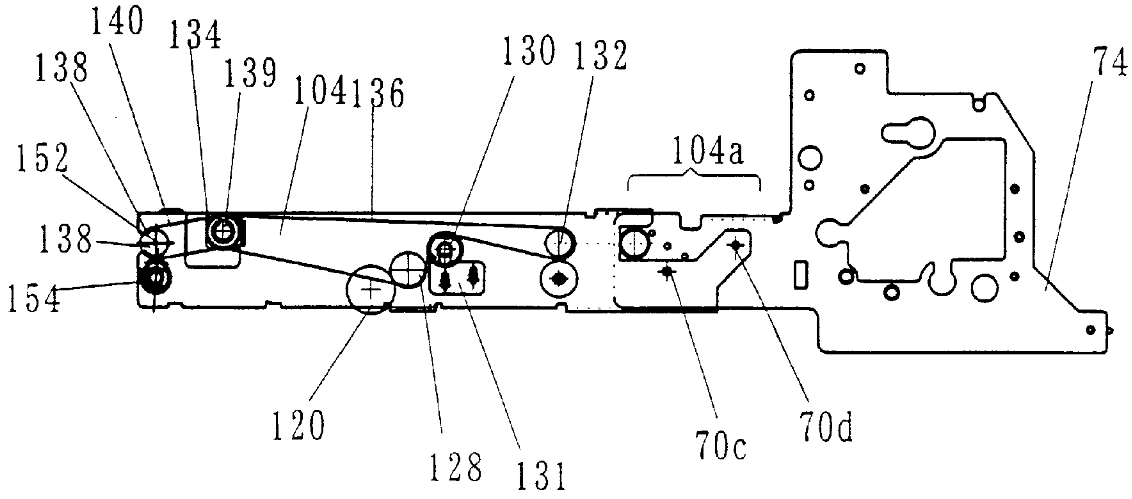
FIG. 7 is a right side view of the carrier unit 100 shown in FIG. 6 along bill feeding direction B.
Figure 8:
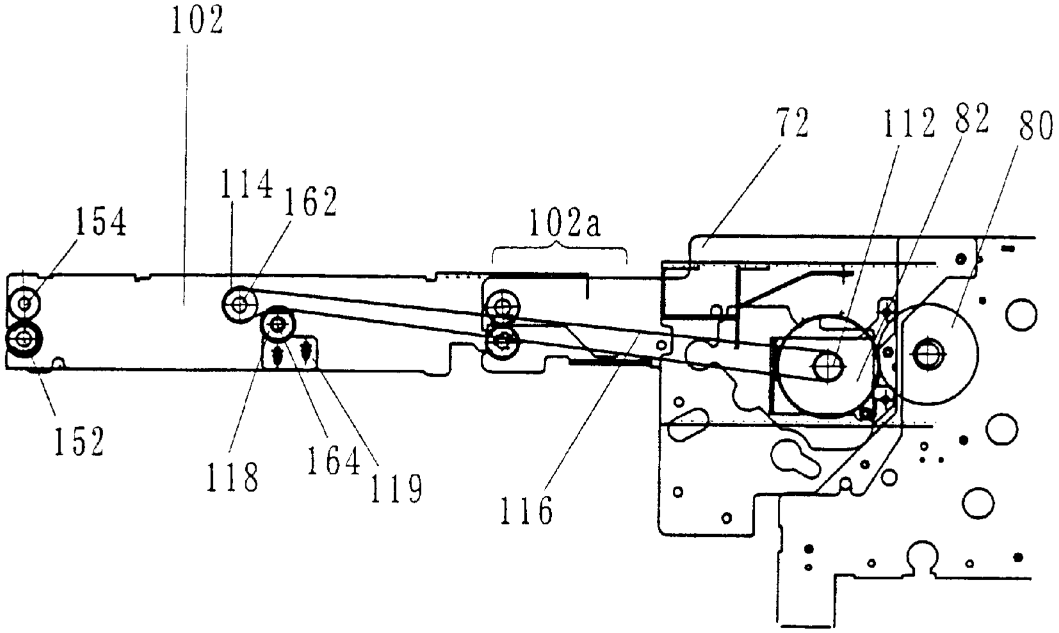
FIG. 8 is a left side view of the carrier unit 100 shown in FIG. 6 along the bill feeding direction B.

The carrier unit 100 has a pair of side frames 102, 104, driving system 110, bill feed system 150, and bill detector system 250. FIGS. 6–8 are views for explaining the driving system 110: FIG. 6 is a plane view of the carrier unit 100. FIG. 7 is a right side view of the carrier unit 100 along the bill feeding direction B shown in FIG. 6. FIG. 8 is a left side view of the carrier unit 100 along the bill feeding direction B shown in FIG. 6. FIGS. 7 and 8 are illustrated upside down.

The side frame 104 shown in FIG. 7 and the side frame 102 shown in FIG. 8 are made of metal thin frames having predetermined strength, and secured at connection part 102*a,* 104*a* to the bill dispensing part 68 of the BDU 32 by attachment screws 70*a*–70*d* (although screws 70*a*–70*b* are omitted in FIG. 8). Thereby, the carrier unit 100 is connected to the bill dispensing part 68 of the BDU 32.

The attachment screws 70*a*–70*d* have been used conventionally to essentially secure the side frames 72, 74 to the bill dispensing part 68 by being inserted into screw holes of the side frames 72, 74. The carrier unit 100 of the present invention utilizes as it is the attachment means (i.e., the attachment screws 70*a*–70*d*) that have been used for the BDU 32 conventionally, without requiring independent means for connecting the carrier unit 100 to the BDU 32. Thus, the present invention may provide the mass-producible carrier units 100 attachable to the BDU 32 depending on the thickness of the wall without changing a design of the conventional BDU 32. As far as the side frames 102, 104 are stably fixed onto the BDU 32, the fixing means is not limited to the above attachment screws 70*a*–70*d*. For example, if the conventional BDU 32 has a predetermined convex, the carrier unit may have a concave or engagement hole which fits the convex. If necessary, a span of each of the side frames 102, 104 may be extended and fixed onto the body of the BDU 32, increasing the attachment strength. Of course, optionally, the conventional BDU 32 may have independent connecting means for the carrier unit.

As one example, the side frames 102, 104 may have the approximately same shape. As described later, both members are provided with driving systems asymmetrically with respect to centerline C of the carrier unit 100. Therefore, even though the side frames 102, 104 are made to have the same shape and the same screw hole arrangement for production purposes, they are different in that different screw holes at different screw positions are used for them.

In connection with the driving system 110, the side frames 102, 104 rotatably support shafts 152, 162. As discussed later, the side frame 102 is provided with driving system 110*a* primarily for upper feed system 150*a* of bill feed system 150, whereas the side frame 102 is provided with driving system 110*b* primarily for lower feed system 150*b* of bill feed system 150.

The driving system 110 serves to drive the bill feed system 150 which will be described later, and includes the driving system 110*a* which drives the upper feed system 150*a* of the bill feed system 150, and the driving system 110*b* which drives the lower feed system 150*b*. The driving system 110*a* for the upper feed system 150*a,* primarily provided on the side frame 102 includes, as shown in FIG. 8, roller 114, drive transmission belt 116 spanned between rollers 112 and 114, and shaft 162 which penetrates and supports the roller 114.

The roller 112 is fixed onto shaft 78 concentric to drive transmission gear 82, and supported on the side frame 72 so that it is rotatable with the shaft 78. The drive transmission gear 82 is geared with drive transmission gear 80 connected to a motor (not shown) in the BDU 32. Therefore, the roller 112 may obtain driving force from the motor (not shown) through the drive transmission gears 80, 82 and the shaft 78. The shaft 78, drive transmission gears 80, 82, motor (not shown), and other components are used to feed bills 41 to the bill dispensing part 68, but they are well known as disclosed in Fujitsu CA02467-B051 and a detailed description thereof will be omitted.

Drive transmission belt 116 is passed around the roller 112. When the roller 112 rotates with the shaft 78, it rotates accordingly. In order to prevent slip between the roller 112 and the drive transmission belt 116, it is clear that an uneven pattern may be formed on the inner side of the belt and a corresponding pattern is formed on the surface of the roller. This is applicable to all the other rollers and drive transmission belts, bill feed belts, and other belts.

The roller 114 is fixed onto the one end of the shaft 162, and supported on the side frame 102 so that it is rotatable with the shaft 162. The roller 114 is connected to the roller 112 through the drive transmission belt 116. Thus, the roller 114 may receive driving force from the roller 112, and transmit the force to the shaft 162. As shown in FIG. 6, the shaft 162 extends perpendicularly with respect to the bill feeding direction B at an approximately middle of the carrier unit 100, and also serves as the driving system 110*b* of the lower feed system 150*a,* as discussed below.

As understood from the foregoing, the carrier unit 100 of the present invention obtains power for feeding the bills 41 from the external BDU 32. Thereby, the number of components can be reduced and the mechanism can be simplified in comparison with the carrier unit having a separate power source. Since control of the motor (not shown) in the BDU 32 leads to control of the movement of the bills 41, the controller 33 of the BDU 32 may control the carrier unit 100. Of course, optionally, the carrier unit 100 may have a separate power source, such as a motor, and a separate control unit.

Tension roller 118 is positioned between the rollers 112 and 114. The tension roller 118 is rotatably supported on shaft 164 on the side frame 102 by metal thin plate (tension assembly) 119 which is made of stainless or other materials. The tension roller 118 contacts and guides the drive transmission belt 116, while compressing it to provide the belt 116 with predetermined tension. The compression force applied by the tension roller 118 is adjusted by attachment screw on the metal thin plate 119. Of course, the tension roller 118 may have such compression force, using a spring or other means (not shown).

In the instant embodiment, the same roller is used for the rollers 112, 114 and 118, but different rollers having different diameters and widths may be employed.

The driving system 110*b* for the lower feed system 150*b* is provided primarily on the side frame 104, as shown in FIG. 7, and includes shafts 162, 126, 139 and 152; gear 120 fixed onto the other end of the shaft 162; gear 122 which is fixed onto one end of the shaft 126 and geared with the gear 120; roller 128 fixed onto the other end of the shaft 126; roller 134 secured onto one end of the shaft 139; roller 135 secured to the other end of the shaft 139; tension roller 130; roller 132; roller 138 secured onto the other end of the shaft 152; drive transmission belt 136 which is passed round the rollers 128, 132, and 134; and drive transmission belt 140 which is passed round the rollers 135 and 138.

As mentioned above, the shaft 162 constitutes the driving system 110*a* for the upper feed system 150*a* and the driving system 110*b* for the lower feed system 150*b*. The gear 120 secured to the shaft 162 is supported inside the side frame 104 so that it can rotate with the shaft 162. The reason why the gear 120 is provided inside the side frame 104 is to keep the gear 120 away from the drive transmission belt 136 and maintain smooth rotations of the drive transmission belt 136.

The gear 122 geared with the gear 120 is rotatably supported, like the gear 120, inside the side frame 104. In this embodiment, the gears 120 and 122 each use a gear having the same diameter and the same number of teeth, but it is possible to use gears different in them if necessary. This applies to other gears.

The shaft 126 penetrates the side frame 104. The gear 122 is fixed onto one end of the shaft 126 which is located inside the side frame 104, whereas the roller 128 is fixed onto the other end of the shaft which is located outside the side frame 104. The roller 128 is connected to the drive transmission belt 136. The tension roller 130 is provided near and under the roller 128. The shaft 126 is positioned lower than the shaft 162.

The tension roller 130 is provided between the rollers 128 and 132, and supported rotatably on the side frame 104 via metal thin plate (tension roller assembly) 131 made of stainless or other materials. The tension roller 130 contacts and guides the drive transmission belt 136, while compressing it to provide the belt 136 with predetermined tension. The compression force applied by the tension roller 130 is adjusted by the attachment screw on the metal thin plate 131. Of course, the tension roller 130 may have such compression force by using a spring or other means (not shown).

The roller 132 is fixed onto one end (not shown) of shaft 168, and connected to the roller 128 via the drive transmission belt 136 outside the side frame 104. Like shaft 206 which will be described later, the shaft 168 is the closest shaft among the carrier unit 100 to the bill dispensing part 68 of the BDU 32. The roller 134 is fixed onto one end of the shaft 139 outside the side frame 104. The roller 135 is connected to the other end of the shaft 139 inside the side frame 104. As shown in FIG. 7, among the driving system 150*b* for the lower feed system 150*b*, the shaft 139 is one of the lowest shafts.

The roller 134 is connected to the roller 128 via the drive transmission belt 136 outside the side frame 104. The roller 135 is connected to the roller 138 via the drive transmission belt 140 inside the side frame 104. The roller 138 is positioned inside the side frame 104. The shaft 152 onto which the roller 138 is fixed is, similar to shaft 154 which will be described later, one of the closest shafts to the bill dispensing part 101 in the carrier unit 100.

Figure 9:
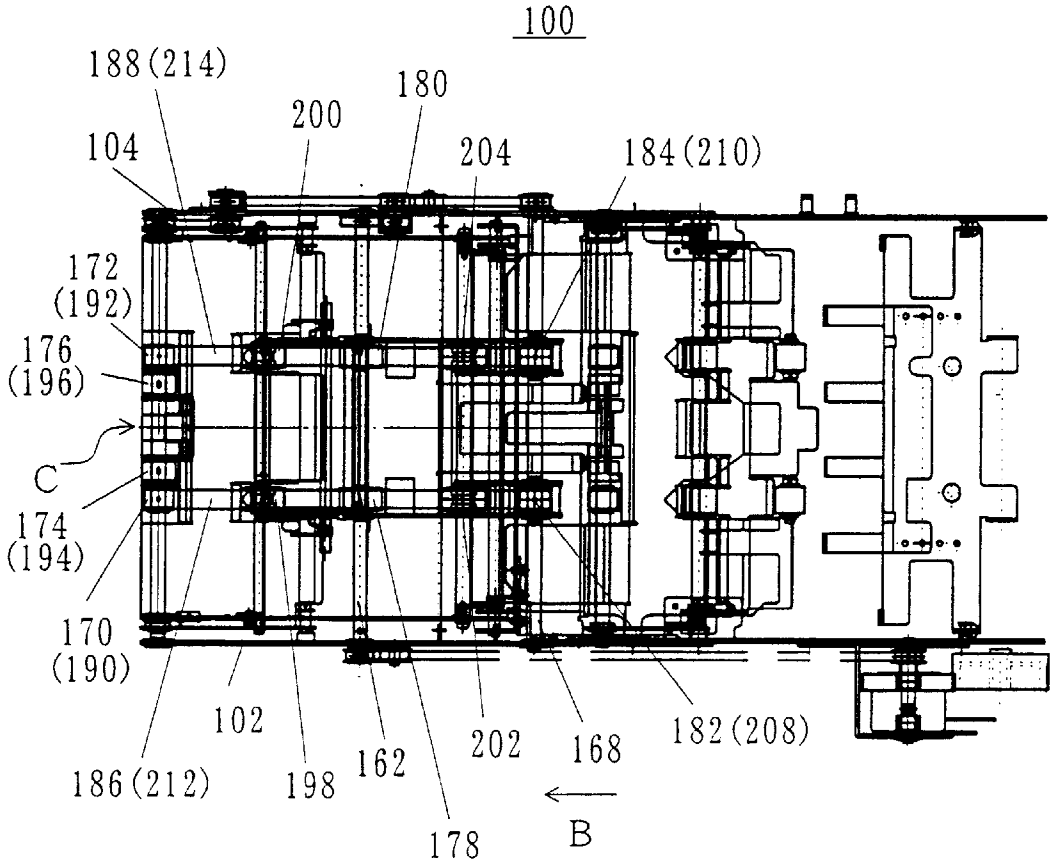
FIG. 9 is an enlarged plane view for explaining bill carrier system 150 in the carrier unit 100 of the present invention shown in FIG. 5.
Figure 10:
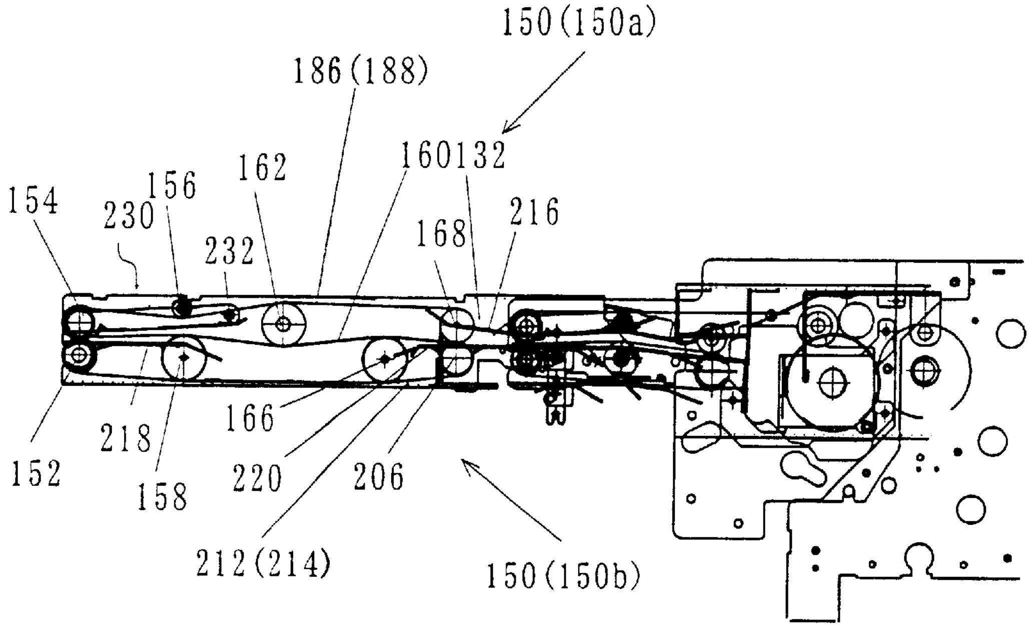
FIG. 10 is a sectional view along a bill feed belt of the carrier unit 100 shown in FIG. 9.
Figure 11:
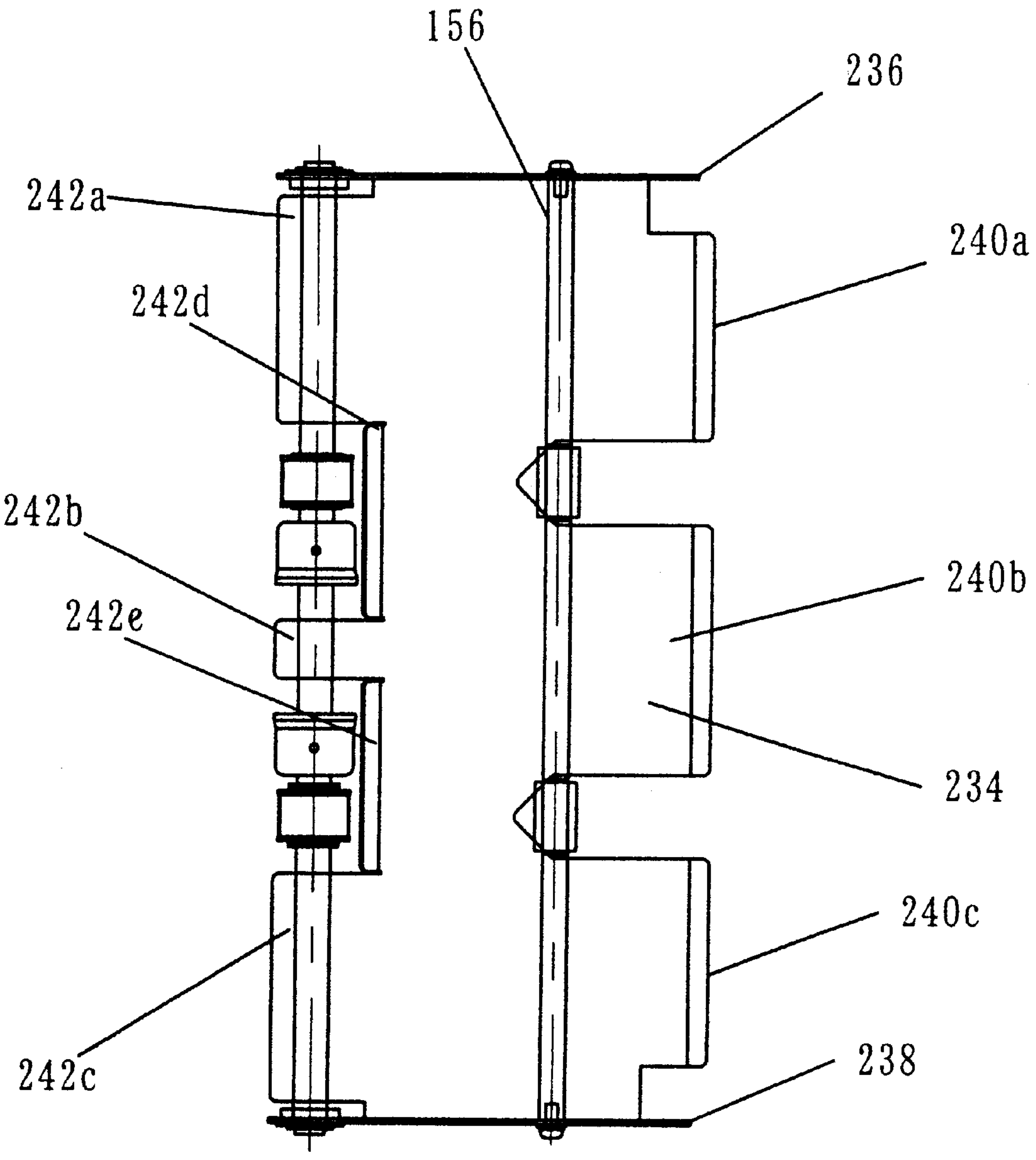
FIG. 11 is an enlarged view of movable guide 230 of the carrier unit 100 shown in FIG. 9.
Figure 12:
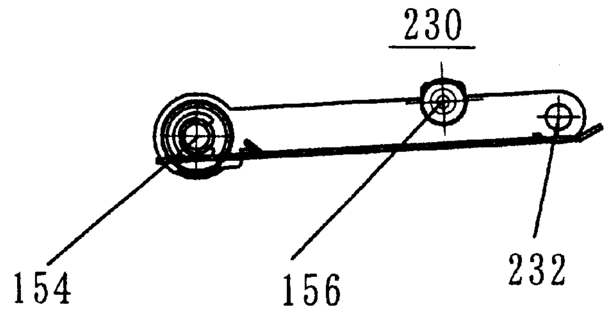
FIG. 12 is a side view of the movable guide 230 shown in FIG. 11.

Referring to FIGS. 9–12, a description will be given of the bill feed system 150 of the carrier unit 100 of the present invention. FIG. 9 is a plane view which shows the bill feed system 150 of the carrier unit 100 of the present invention. FIG. 10 is a sectional view along the bill feed system 186 (or 212) of the carrier unit 100 shown in FIG. 9. FIG. 11 is an enlarged view of the movable guide 230 of the carrier unit 100 shown in FIG. 9. FIG. 12 is a side view of the movable guide 230 shown in FIG. 11.

The bill feed system 150 serves to receive the bills 41 dispensed from the bill dispensing part 68 of the BDU 32, and carry them to the bill dispensing outlet 20 in the facade 10. The bill feed system 150 includes the upper feed system 150*a* which contacts the top surface of the bills 41 via the bill feed belt 186, and guides and feeds the bills 41 while compressing them; and the lower feed system 150*b* which contacts the bottom surface of the bills 41 via the bill feed belt 212, and guides and feeds the bills 41 while compressing them. Bill feed path 160 along which the bills 41 is fed from the bill dispensing part 68 of the BDU 32 to the bill dispensing outlet 20 of the facade 10 is formed by the opposite surfaces of the bill feed belts 186, 188 of the upper feed system 150 and bill feed belts 212, 214 of the lower feed system 150*b*. The bill feed belts 186, 188, 212 and 214 are made of rubber flat belts.

The upper feed system 150*a* includes shafts 154, 156, 162 and 168; a pair of feed rollers 170, 172 and a pair of adjustment rollers 174, 176 fixed onto the shaft 154; a pair of feed rollers 178, 180 fixed onto the shaft 162; a pair of feed rollers 182, 184 fixed onto the shaft 168; bill feed belt 186 which is passed round the feed rollers 170, 178, 182; bill feed belt 188 which is passed round the feed rollers 172, 180, 184; the movable guide 230; and upper guide 216.

The feed rollers 170, 178, 182, adjustment rollers 174, and bill feed belt 186 are arranged symmetrical to the feed rollers 172, 180, 184, adjustment rollers 176, and bill feed belt 188 with respect to the centerline C of the carrier unit C. The shaft 154 is attached to the movable guide 230, and may move apart from the shaft 152.

The shaft 156 is attached to the movable guide 230 between the shaft 154 and 162, and contacts tops of the bill feed belts 186, 188. The shaft 156 compresses the bill feed belts 186, 188 so that the bill feed belts 186, 188 each have predetermined tension. The compression force applied by the shaft 156 is adjusted by attachment screws or other members (not shown) on the movable guide 230. Of course, the shaft 156 may have such compression force by using a spring or other means (not shown).

The shaft 168 have a movable guide (not shown) and may move apart from shaft 106 of the lower feed system 150*b*. Since the structure of the movable guide is the same as the movable guide 230, a description thereof will be omitted. The feed rollers 182, 184 fixed onto the shaft 168 guide the bill feed belt 186.

The feed rollers 170, 172, and adjustment rollers 174, 176 are located at the bill dispensing part 101 of the carrier unit 100. The feed rollers 170 and 172 are made of the same roller. The feed rollers 170, 172 and the adjustment rollers 174, 176, cooperating with the feed rollers 190, 192 and adjustment rollers 194, 196 of the lower feed system 150*b* which will be described later, feed the bills 41 to the bill dispensing outlet 20 in the facade 10, and hold a portion of the bills 41 which project from the bill dispensing outlet 20. This will be discussed in detail later.

The adjustment rollers 174, 176 are fixed onto the shaft 154. The adjustment rollers 174, 176 are coaxial with the feed rollers 170, 172, and have slightly larger diameter than the feed rollers 170, 172. The adjustment rollers 174, 176 are made of the same roller. The feed rollers 178, 180 are fixed onto the feed rollers 170, 172, and lie at middle portions between the feed rollers 182, 184. The feed rollers 178, 180 guide the bill feed belts 186, 188, and compress the bill feed belts 186, 188 against the bill feed belts 212, 214 of the lower feed system 150*b*, serving as tension rollers.

As discussed above, since only the shaft 162 obtains driving force among the shafts 154, 156, 162 and 168, and it is the feed rollers 178, 180 fixed onto the shaft 162 that directly drive the bill feed belt 186, 188. Alternatively, it is naturally possible to modify the configuration such that the shaft 154, 156 and/or 168 may be selected as driving shaft(s).

The movable guide 230 includes, as shown in FIGS. 10–12, movement center 232, guide part 234, and a pair of side plates 236, 238. The movement center 232 includes a pair of holes on the side plates 236, 238 and studs which penetrate these holes, and is supported between the side frames 102, 104 rotatably. Since the movement center 232 is fixed to the side plates 236, 238, the movable guide 230 may rotate around the movement center 232 relative to the side frames 102, 104. Alternatively, the movement center 232 may be comprised of a shaft.

One surface of the guide part 234 is located opposite to the bill feed path 160, and guides the bills 41 so that the bills 41 do not get out of the bill feed path 160. The guide part 234 has trifurcate roads 240*a*–240*c*, each top of which is bent in an upper direction. The guide part 234 includes trifurcate roads 242*a*–242*c* at an ejection part for the bills 41. In the guide part 234, concave portions 242*d*, 242*e* of the trifurcate roads opposite to the feed rollers 170, 172, and adjustment rollers 174, 176 are bent upwardly, maintaining smooth actions for these rollers. The guide part 234 may be manufactured by a method using a metal thin plate as well known in the art.

The side plates 236, 238 have the same shape, and are manufactured by forming a metal thin plate in a track shape. Each of the side plates 236, 238 is connected to the movement center 232 at one end thereof, and to shaft 154 at other end thereof. Both members are also connected to the shaft 156 at center and upper portions thereof.

The movable guide 230 maintains smooth feeding of the bills 41 by allowing the shaft 154 to move upwardly where a plurality of bills 41 are fed to the bill dispensing part 101. If the interval between the shafts 152 and 154 is unchangeable, the bills 41 exceeding the predetermined number cannot pass between the shafts 152 and 154. As a result, it is disadvantageously necessary to feed one or small number of bills 41 repeatedly for some times. The carrier unit 100 of the present invention eliminates such a disadvantage by using the movable guide 230.

Upper guide 216 is commonly used, together with lower guide 220 of the lower feed system 150*b*, for the carrier unit 100 and BDU 32. The upper and lower guides that have been provided at the prior art bill dispensing part 68 of the BDU 32 are replaced with longer guides, part of which are used for the BDU 32, and remaining of which are used for the carrier unit 100. The upper guide 216 and lower guide 220 are each bent, as shown in FIG. 10, at portion where the bills 41 are ejected, so as to secure smooth feeding of the bills 41. The upper guide 216 and the lower guides 220, 218 are manufactured by a method that is well known in the art.

The lower feed system 150*b* includes shafts 152, 158, 166 and 206; a pair of feed rollers 190, 192 and a pair of adjustment rollers 194, 196 fixed onto the shaft 152; a pair of feed rollers 198, 200 fixed onto the shaft 158; a pair of feed rollers 202, 204 fixed onto the shaft 166; a pair of feed rollers 208, 210 fixed onto the shaft 206; bill feed belt 212 passed round the feed rollers 190, 198, 202 and 208; bill feed belt 214 passed round the feed rollers 192, 200, 204 and 210; and guides 216 and 218.

The feed rollers 190, 198, 202 and 208, adjustment rollers 194, and bill feed belt 212 are respectively arranged symmetrical to the feed rollers 192, 200, 204, and 210, adjustment rollers 196, and bill feed belt 214 with respect to the centerline C of the carrier unit 100. The feed rollers 190, 192 are the same as the feed rollers 170, 172 of the upper feed system 150*a*. Referring to FIG. 9, the feed roller 190 is located just below the feed roller 170 and contacts it with predetermined pressure. The feed roller 192 is located just below the feed roller 172 and contacts it with predetermined pressure. As described above, these feed rollers 170, 172, 190 and 192 cooperatively compress and feed the bills 41 to the bill dispensing outlet 20 in the facade 10, and hold the bills 41 which project from the bill dispensing outlet 20. We will describe, together with bill detector system 250, a mechanism of these feed rollers 170, 172, 190 and 192 for feeding the bills 41 up to the neighborhood of the bill dispensing outlet 20, and for holding the bills 41 while projecting the bills 41 by a predetermined length from the bill dispensing outlet 20.

As discussed above with reference to FIG. 7, only the shaft 152 obtains driving force among the shafts 152, 158, 166 and 206, and it is the feed rollers 190, 192 fixed onto the shaft 152 that directly drive the bill feed belt 212, 214. Alternatively, it is naturally possible to modify the configuration such that the shaft 158, 166 and/or 206 may be selected as driving shaft(s).

The adjustment rollers 194, 196 are the same as the adjustment rollers 174, 176 of the upper feed system 150*a*. Referring to FIG. 9, the feed roller 194 is located just below the feed roller 174 and contacts it with predetermined pressure. The feed roller 196 is located just below the feed roller 176 and contacts it with predetermined pressure. As described, the adjustment rollers 174, 176, 194 and 196 cooperatively eliminate crease or fold of the bills 41, enabling the bills 41 to be dispensed without failure.

The adjustment rollers 194, 196 are fixed onto the shaft 152. The adjustment rollers 194, 196 are coaxial with the feed rollers 190, 192, and have slightly larger diameter than the feed rollers 190, 192. The adjustment rollers 194, 196 apply compression force to the bills 41 that have reached the bill dispensing part 101, in cooperation with the adjustment rollers 174, 176. As shown in FIG. 3, as the bill dispensing outlet 20 in the facade 10 have only a predetermined width, if the fed bills 41 are not properly aligned with the bill dispensing outlet 20, e.g., folded, then the bills 41 would not project from the bill dispensing outlet 20 and result in collision with the rear surface of the facade 10 near the bill dispensing outlet 20. Accordingly, the adjustment rollers 174, 176, 194 and 196 eliminate such a crease or fold of the bills 41, and enable the bills 41 to align with the bill dispensing outlet 20 so that the bills 41 may project from it.

The shaft 158 is held by the side frames 102, 104. The feed rollers 198, 200 fixed onto the shaft 158 lie at approximately middle portions between the feed rollers 190, 192 and the feed rollers 178, 180. The feed rollers 190, 192 guide the bill feed belts 212, 214, and compress the bill feed belts 212, 214 against the bill feed belts 186, 188, serving as tension rollers.

The shaft 166 is held by the side frames 102, 104. The feed rollers 202, 204 fixed onto the shaft 166 lie at approximately middle portions between the feed rollers 178, 180 and the feed rollers 208, 210. The feed rollers 202, 204 guide the bill feed belts 212, 214, and compress the bill feed belts 212, 214 against the bill feed belts 186, 188, serving as tension rollers.

The shaft 206 is held by the side frames 102, 104. As discussed above, the shaft 206 is, like the shaft 132, a shaft closest to the BDU bill dispensing part 68 in the carrier unit 100. The rollers 208, 210 secured onto the shaft 206 guide the bill feed belts 212, 214.

The lower guide 218 guides the bills 41 so that the bills 41 being fed do not get out of the bill feed path 160. The lower guides 218, 220 are fixed onto the side frames 102, 104. The lower guides 218, 220 may be connected to the shafts 152, 206, respectively.

Figure 13:
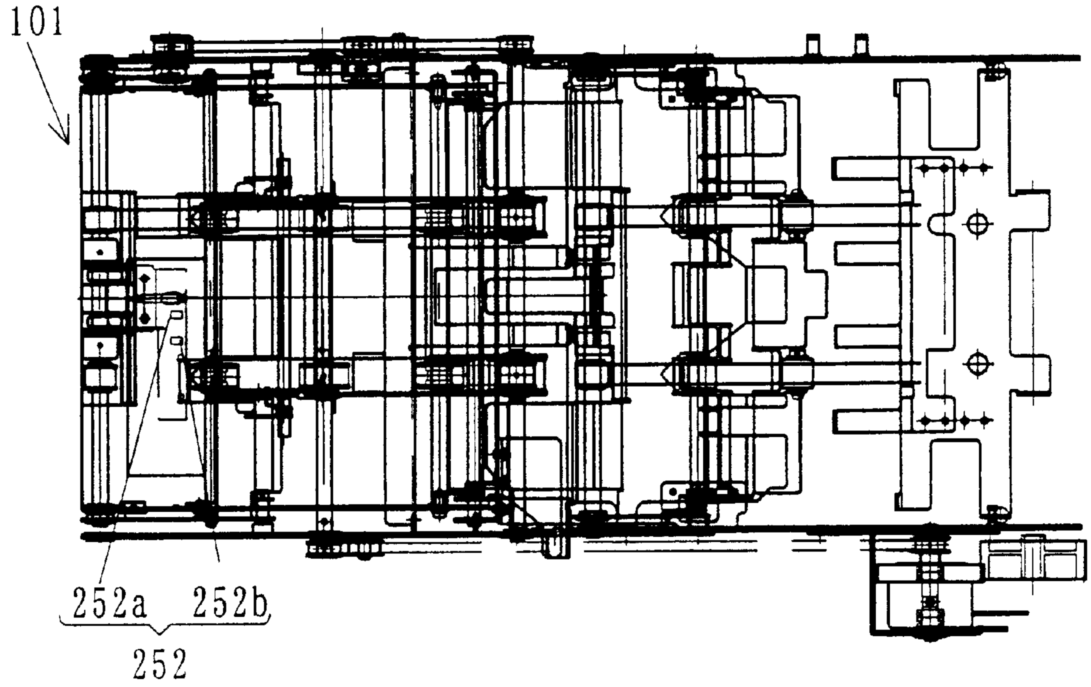
FIG. 13 is an enlarged plane view for explaining bill detector system 250 in the carrier unit 100 of the present invention shown in FIG. 5.

Referring to FIGS. 13–14, a description will be now given of the bill detector system 250 in the carrier unit 100 of the present invention. FIG. 13 is a plane view which shows the bill detector system 250 in the carrier unit 100 of the present invention. FIG. 14 is a sectional view including sensor 252 of the bill detector system 250 shown in FIG. 13.

The bill detector system 250 serves to detect whether the bills 41 has been fed to the bill dispensing part 101 in the carrier unit 100 from the bill dispensing part 68 in the BDU 32, and informs the BDU controller 33 and the main controller 2 of the result. The bill detector system 250 includes sensor 252 and sensor lever 254.

The sensor is comprised of a well-known photo sensor including light emitting element 252*a* and light receiving element 252*b*. The sensor 252 optically detects an object when the object crosses a communication channel between the light emitting element 252*a* and the light receiving element 252*b*. The sensor 252 is connected to the BDU controller 33 and the main controller 2.

As shown in FIG. 14, the sensor lever 254 has a sectional L-shape and is provided at the bill dispensing part 101 in the carrier unit 100. The sensor lever 254 is rotatably connected at one end thereof to the shaft 154 (or the side frames 102, 104 directly), and extends at the other end thereof to the neighborhood of the sensor 252. The sensor lever 254 is connected to the bill feed path 160, and may contact the bills 41 which is being fed. The other end of the sensor lever 254 is usually located, by gravity or force applied by a spring member (not shown), at position 256 which does not obstruct the communication channel between the light emitting element 252*a* and the light receiving element 252*b*. However, when the bills 41 being fed are engaged with the sensor lever 254, the feeding force of the bills 41 which is larger than the force applied to the sensor lever 254 rotates the sensor lever 254 around the shaft 154, moving the other end of the sensor lever 254 to position 258 which does obstruct the communication channel between the light emitting element 252*a* and the light receiving element 252*b*. Thereby, the sensor 252 detects that the bills 41 have been fed to the bill dispensing part 101, and informs the main controller 2 and the BDU controller 33 of the result directly or indirectly. Optionally, it is possible to arrange the sensor lever 254 such that it is usually located at position 258 and moved to the position 256 in detecting the bills.

The positions of the sensor 252 and the sensor lever 254 are not limited to those disclosed in this embodiment. For example, the sensor lever 254 may be connected rotatably around the shaft 152. Needless to say, the sensor 252 is not limited to the photo sensor, and any detecting device well known in the art may be used for the bill detector system 250.

Figure 15A:
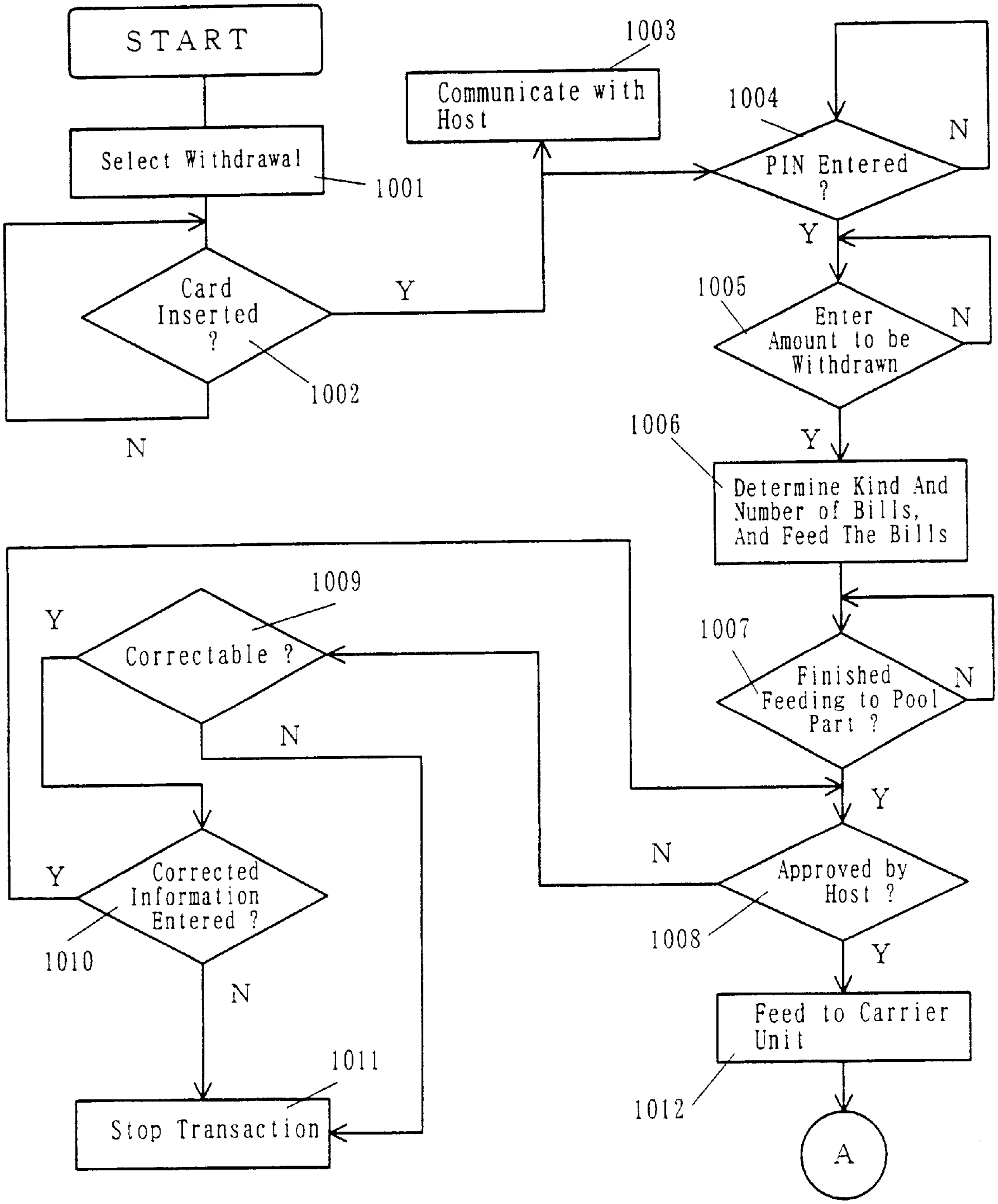
FIGS. 15A and 15B are flowcharts of a withdrawal operation of the ATM 1 of the present invention shown in FIG. 1.
Figure 15B:
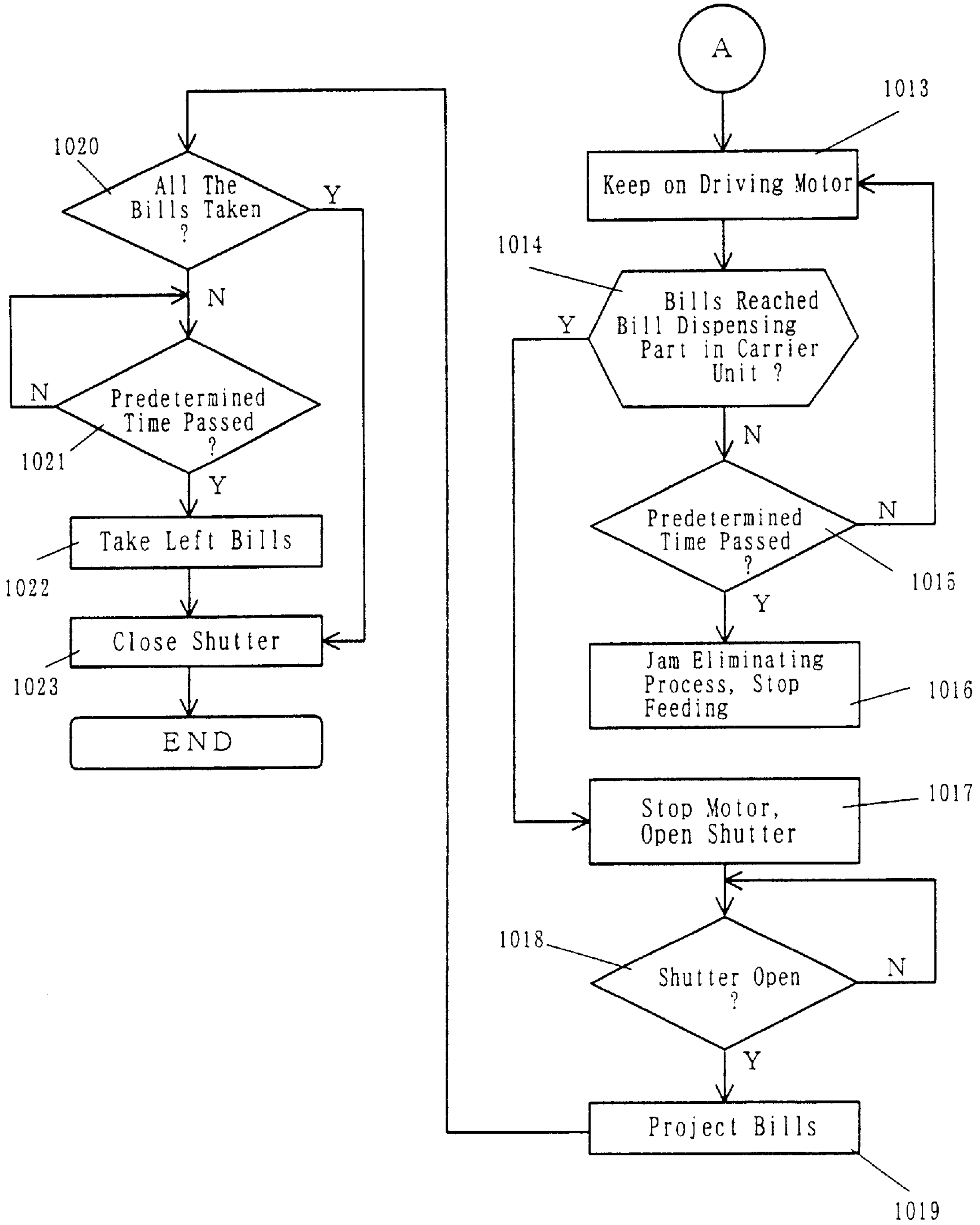

Referring to FIGS. 15A and 15B, a description will be given of the withdrawal action of through-the-wall ATM 1 of the present invention. Initially, a user selects withdrawal transaction (withdrawal), operating the function keys 14 in accordance with guidance on the operation screen 12 on the facade 10 (step 1001). In response, the operation screen 12 requires the user to insert his/her card, and then the user inserts the card in the card inlet 1 (step 1002).

Under control of the CRU controller 4, the inserted card is fed to the CRU and the information recorded on its magnetic stripe is read out. The main controller 2 receives such information via the CRU controller 4, and communicates via the communication part 3, based on this information, with the host computer of a financial institution that issued the card (step 1003).

The user enters a PIN in accordance with the guidance of the operation screen 12 (step 1004). In general, the order of the steps 1001 and 1002 may change. Next, the operation screen 12 requires the user to enter the amount to be withdrawn, and the user enters the withdrawal amount through the keyboard 16 (step 1005). If the user enters a clearly erroneous PIN or the withdrawal amount exceeding the transactional limit, then he/she would be so notified and then required to enter these information again.

The main controller 2 receives the PIN and withdrawal amount entered by the user, transmits them to the host computer, and requests the check of appropriateness and the transactional approval. Optionally, the operation screen 12 prompts the user for inserting a bankbook. When receiving the withdrawal amount from the facade 10, the main controller 2 determines, expecting that it may receive the transactional approval from the host computer and attempting to shorten the transaction time, the kind and number of bills corresponding to the withdrawal amount, and instructs the BDU 32 to feed the bills (step 1006). Thereby, when the user desires $300.00, the BRU 32 recognizes that it should feed fifteen twenty-dollar bills from the cassette 40. Optionally, the BRU 32 may recognize, for user's convenience, that it should feed fourteen twenty-dollar bills from the cassette 40 and two ten-dollar bills from the cassette 38, totally sixteen sheets. In accordance with the instruction from the main controller 2, the BRU 32 feeds all of fifteen bills 41 to the pool part 66 (step 1007). The fed bills 41 are temporarily pooled in the pool part 66.

When the main controller 2 receives a response of a disapproval of the transaction from the host computer (step 1008), if the defect is incurable, for example, because of no transaction available with the card (step 1008), the main controller 2 terminates the transaction, informing the user of the reason (step 1011). In this case, the bills 41 stored in the pool part 66 are returned to the rejection area 35 in the cassette 34.

If the defect is curable, for example, when the PIN is wrong (step 1009), the operation screen 12 prompts the user for reentry of the PIN or the withdrawal amount (step 1010). The main controller 2 receives the corrected information and request the host computer to judge the correctness again. The predetermined number of reentries resulting in failure would similarly terminate the transaction (step 1011). If the correct PIN and/or withdrawal amount are reentered and the host computer provides a transactional approval, the bills 41 which have been stored in the pool part 66 are fed together to the carrier unit 100 from the bill dispensing part 68 (step 1012).

The main controller 2, when receiving an approval of the transaction from the host computer (step 1008), instructs the BDU 32 to feed the bills 41 which have been pooled in the pool part 66 to the carrier unit 100 (step 1012). As described above, the carrier unit 100 obtains driving force from the BDU 32. The driving force for dispensing the bills 41 stored in the pool part 66 of the BDU 32 from the bill dispensing part 68, and the driving force by which the carrier unit 100 feeds the bills 41 obtained from the BDU 32 to the bill dispensing part 101 are generated by the common motor (not shown). Accordingly, the controller 33 of the BDU 32 which received a dispensation instruction from the main controller 2 keeps on driving the motor even after dispensing the bills 41 to the carrier unit 100, whereby the bills 41 may be fed to the bill dispensing part 101 of the carrier unit 100 (step 1013).

A description will now be given of an operation of each component of the carrier unit 100 from when the bills 41 are ejected from the bill dispensing part 68 of the BDU 32 to when the bills 41 are fed to the bill dispensing part 101 of the carrier unit 100.

When the motor in the BDU 32 continues to be driven, the drive transmission gear 80 connected directly or indirectly to it rotates clockwise with respect to a direction viewing the frame 102 of the carrier unit 100. Consequently, the drive transmission gear 80 drives the drive transmission gear 82 coupled to it. When the drive transmission gear 82 rotates clockwise, the shaft 78 onto which it is fixed rotates together clockwise, and consequently the roller 112 which is fixed onto the shaft 78 rotates together clockwise. Due to the driving of this roller 112, the driving system 110*a* for the upper feed system 150*a* is driven.

In other words, the drive transmission belt 116 rotates clockwise, and the roller 114 and the shaft 162 rotate together clockwise under the predetermined tension applied by the tension roller 118. The rotation of the shaft 162 drives the lower feed system 150*b* and the upper feed system 150*a*. First, the driving system 100*b* of the lower feed system 150*b* is driven.

The gear 120 fixed onto the other end of the shaft 162 rotates together with the shaft 162, and consequently the gear drives the gear 122 which is coupled to it. When the gear 122 rotates, the shaft 126 onto which it is secured rotates together, and consequently the roller 128 fixed onto the shaft 126 rotates together. The roller 128 rotates together with the drive transmission belt 136 (counterclockwise with respect to a direction viewing the frame 104 of the carrier unit 100), and the rollers 132 and 134 rotate under the predetermined tension applied by the tension roller 130.

When the roller 134 rotates, the shaft 139 and the roller 135 rotate together with the roller 134. As a consequence, the drive transmission belt 140, the roller 138 connected to the drive transmission belt 140, and the shaft 154 onto which the roller 138 is fixed are driven. The rotation of the shaft 154 drives the lower feed system 150*b*.

A description will now be given of an operation of the upper feed system 150*a* as a result of driving of the shaft 162. When the shaft 162 rotates clockwise with respect to a direction viewing the frame 102 of the carrier unit 100, a pair of rollers 178, 180 fixed onto the shaft 162 rotate clockwise. As a result, the bill feed belts 186, 188 connected to the rollers 178, 180 rotate clockwise.

Along with the rotation of the bill feed belt 186, the rollers 170, 182 rotate under the predetermined tension applied by the shaft 156 and the rollers 198, 202. Along with the rotation of the bill feed belt 188, the rollers 172, 184 rotate under the predetermined tension applied by the shaft 156 and the rollers 200, 204.

Next follows a description of an operation of the lower feed system 150*b* as a result of driving of the shaft 152. When the shaft 152 rotates clockwise with respect to a direction viewing the frame 102 of the carrier unit 100, a pair of rollers 190, 192 fixed onto the shaft 152 rotate clockwise. As a result, the bill feed belts 212, 214 connected to the rollers 190, 192 rotate clockwise.

Along with the rotation of the bill feed belt 212, the rollers 198, 202 and 208 rotate under the predetermined tension applied by the roller 178. Along with the rotation of the bill feed belt 214, the rollers 200, 204 and 210 rotate under the predetermined tension applied by the roller 180.

In this way, the bill feed belts 186, 188, 212 and 214 rotate in the bill feed path 160 so that the bills 41 may be fed in the bill feeding direction B. These belts are compressed against each other, and thus rotate together, preventing such a situation where the upper bill feed belts 186, 188 rotate faster than the lower bill feed belts 212, 214 whereby a plurality of stacked bills 41 become scattered during feeding.

Due to the bill feed system 150, the bills 41 are fed from the bill dispensing part 68 of the BDU 32 to the bill dispensing part 101 of the carrier unit 100 while assisted by the guides 216, 218, 220 and 230.

The controller 33 of the BDU 32 is connected to a timer and comparator (not shown) so as to detect jamming. The timer measures feed period of time of the bills 41. In this embodiment, the starting point of reckoning for the feed time is set to time when the bills 41 are received by the carrier unit 100. However, optionally, it may be set to time when the bills 41 reach a predetermined location in the BDU 32. The measurement result is sent to the comparator, and the comparator compares the time with the reference time. When the carrier unit 100 is attached to the BDU 32, the feed period becomes longer by the unit. Therefore, the reference time has been adjusted in advance in the firmware or software in the controller 33 of the BDU 32. In this way, unless the bills 41 reach the bill dispensing part 101 within the reference period of time (step 1015), the controller 33 recognizes that there was jamming, stops feeding, and informs the main controller 2 of the fact (step 1016). If the feed time does not reach the reference time, then the motor continues to be driven (steps 1015, 1013).

Whether the fifteen bills 41 reach the bill dispensing part 101 is detected by the bill detector system 250 of the carrier unit 100 (step 1014). Reaching the bill dispensing part 101, the bills 41 are engaged with the sensor lever 254 and displace the sensor lever 254 from the position 256 to the position 258. As a result, the sensor lever 254 crosses the communication channel between the light emitting element 252*a* and the light receiving element 252*b*. Such a detection signal is transmitted to the controller 33 of the BDU 32 and the main controller 2.

During this period, the fifteen bills 41 are engaged with the guide part 234 of the movable guide 230 and rotate the guide part 234 around the movement center 232 clockwise by a necessary amount. Since the shaft 154 with the movable guide 230 is spaced from the shaft 152, the bills 41 do not jam between the rollers 170, 172, 190 and 192.

In response, the main controller 2 instructs the controller 33 of the BDU 32 to temporarily stop feeding the bills 41 (step 1017). This is because the shutter 21 closes at the bill dispensing outlet 20 in the facade 10 and thus the continuous feeding of the bills 41 would cause a collision of the bills 41 with the shutter 21. The motor of the BDU 32 is stopped until the shutter 21 opens (step 1017).

The main controller 2 simultaneously instructs the facade 10 to open the shutter 21 at the bill dispensing outlet 20 (step 1017).

The main controller 2, when receiving a response from the facade 10 that the shutter 21 has opened (step 1018), instructs the controller 33 of the BDU 32 to resume feeding of the bills 41. In response, the controller 33 of the BDU 32 drives the motor so that the bills 41 project from the bill dispensing outlet 20 by a predetermined length. Usually, the bill 41 has a length of 66–82 mm in the feeding direction, and controller 33 of the BDU 32 drives the motor (not shown) for predetermined period of time or rotates the motor shaft by a predetermined angle so that the bills 41 proceed by about 40 mm. As a result, part of the bills 41 project from the bill dispensing outlet 20 and become ready to be taken out by the user (step 1019). Optionally, an independent sensor may be provided at the bill dispensing outlet 20 in the facade 10 so as to ascertain the projection of the bills 41.

The bills 41 are partially held by the rollers 170, 172, 190 and 192, and still intercepting the communication channel between the light emitting element 252*a* and light receiving element 252*b*. Any crease which might exist partially or wholly in the bills is removed by the adjustment rollers 174, 176 194 and 196, and the bills 41 may project from the bill dispensing outlet 20 successfully.

When the user takes out all the bills 41, the sensor lever 254 returns to the position 256. The main controller 2, when receiving such a detecting signal from the sensor 252, instructs the facade 10 to close the shutter 21 at the bill dispensing outlet 20 (step 1023).

If a predetermined period of time passes while the user does not take out all the bills (steps 1020, 1021), the main controller 2 instructs the controller 33 of the BDU 32 to take in the bills 41 which have been forgot to be taken out (step 1022). The clock (not shown) which measures the predetermined period of time at step 1019 may be provided at the facade 10 or in the housing 30. In accordance with the instruction from the main controller 2, the controller 33 of the BDU 32 takes in the bills 41 by rotating the motor in a reverse direction. The bills 41 are then fed to the rejection area 35 in the cassette 34 through the sorting part 60 of the BDU 32.

After the bills 41 are taken in, the shutter 21 closes (step 1023). The eject of the bills 41 is detected by the sensor 252 in the carrier unit 100 or a sensor which is optionally provided at the bill dispensing outlet 20.

Then, the card is returned, a receipt is issued, the banknote is recorded, and other procedures are conducted. These procedures are the same as the conventional manner, and thus a description thereof will be omitted.

In the instant embodiment, the host computer verifies a PIN and judges whether the withdrawal amount is within the allowable limit. However, the main controller 2 optionally obtains information from a ledger file administered by the host computer, and verifies them by itself.

Figure 16:
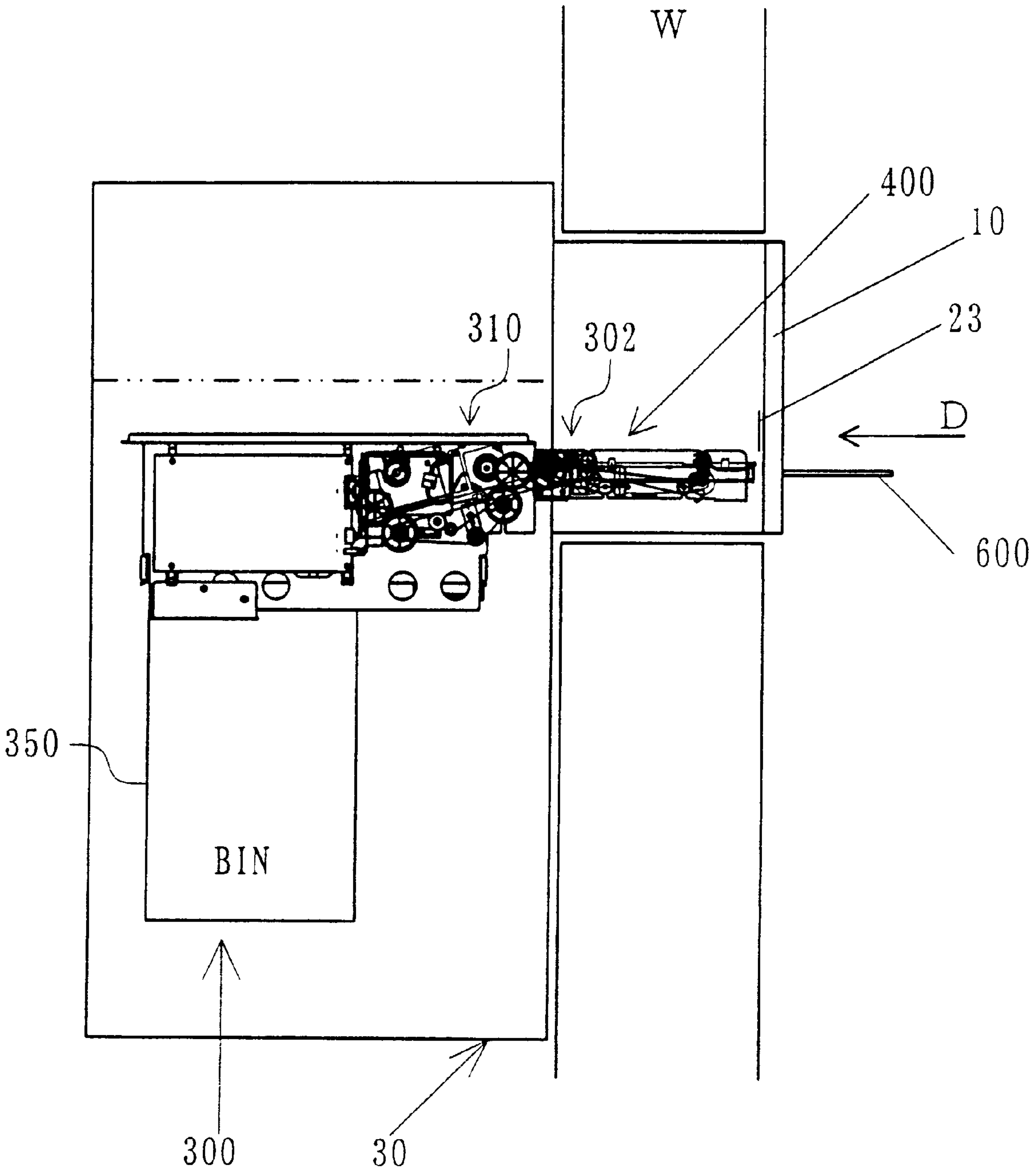
FIG. 16 is a sectional view of an essential part of the ATM 1 shown in FIG. 1 for explaining an arrangement among the facade 10, EDU 300, and carrier unit 400.
Figure 17:
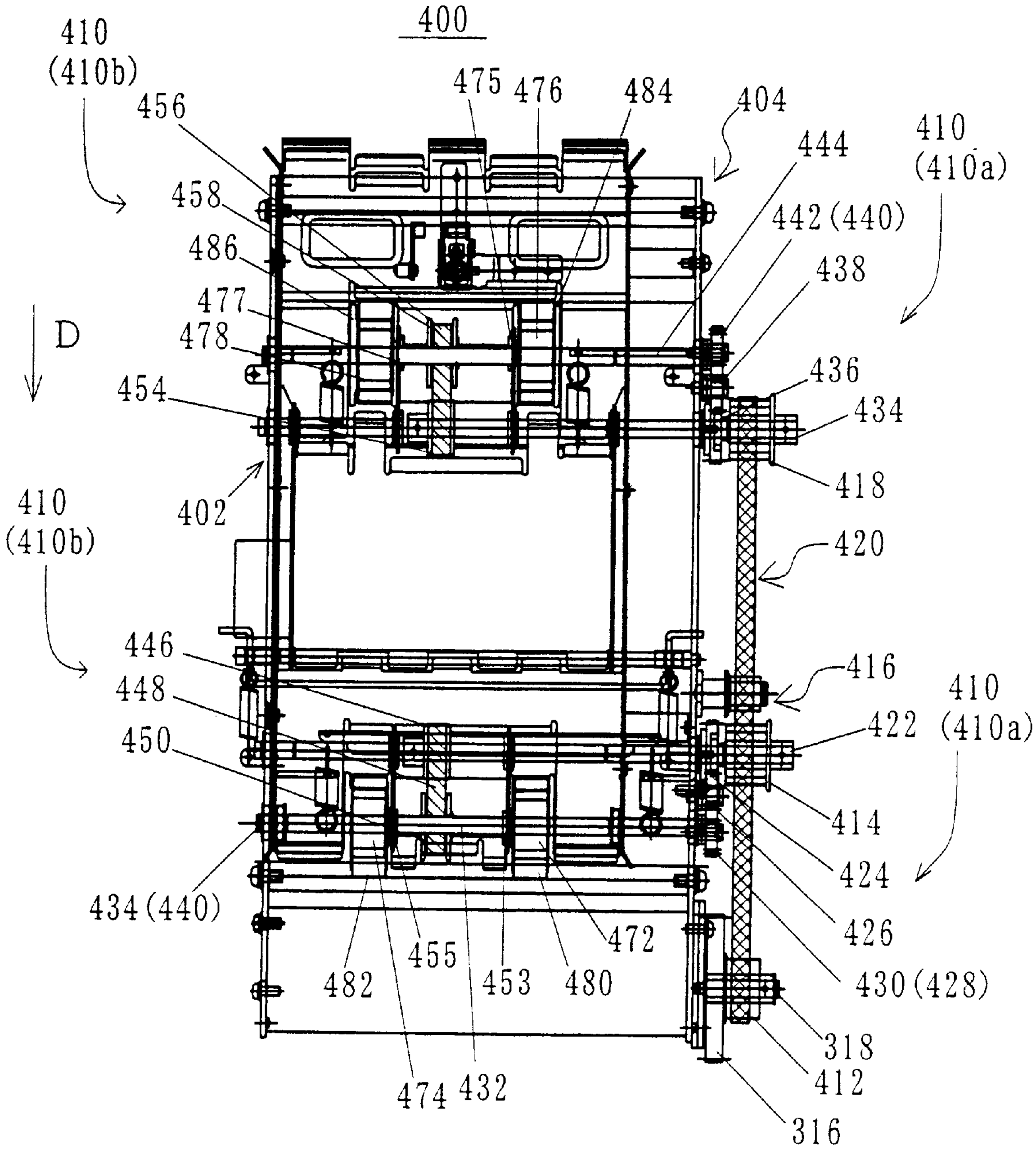
FIG. 17 is an enlarged plane view for explaining driving system 410 and envelope feed system 470 of the carrier unit 400 shown in FIG. 16.
Figure 18:
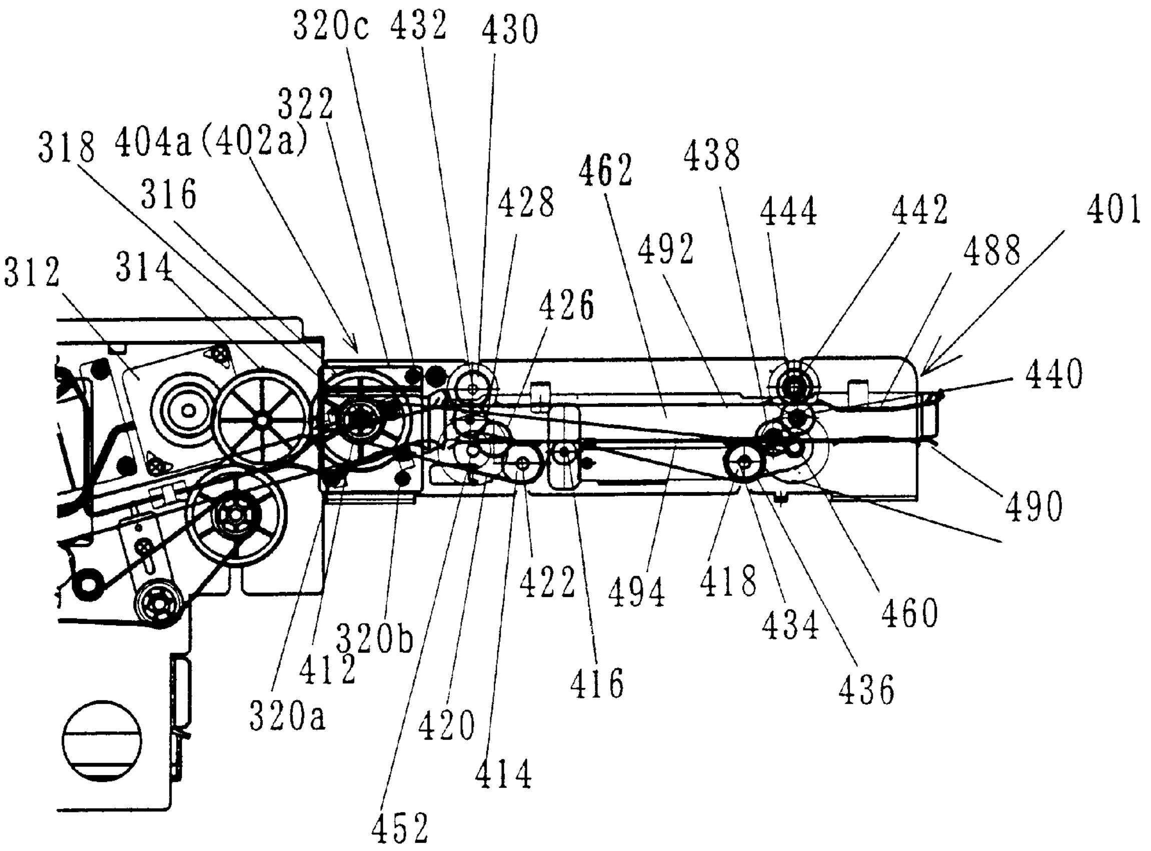
FIG. 18 is an enlarged side view showing the driving system 410 and envelope feed system 470 in the carrier unit 400 shown in FIG. 16, and a relationship among them and EDU 300.
Figure 20:
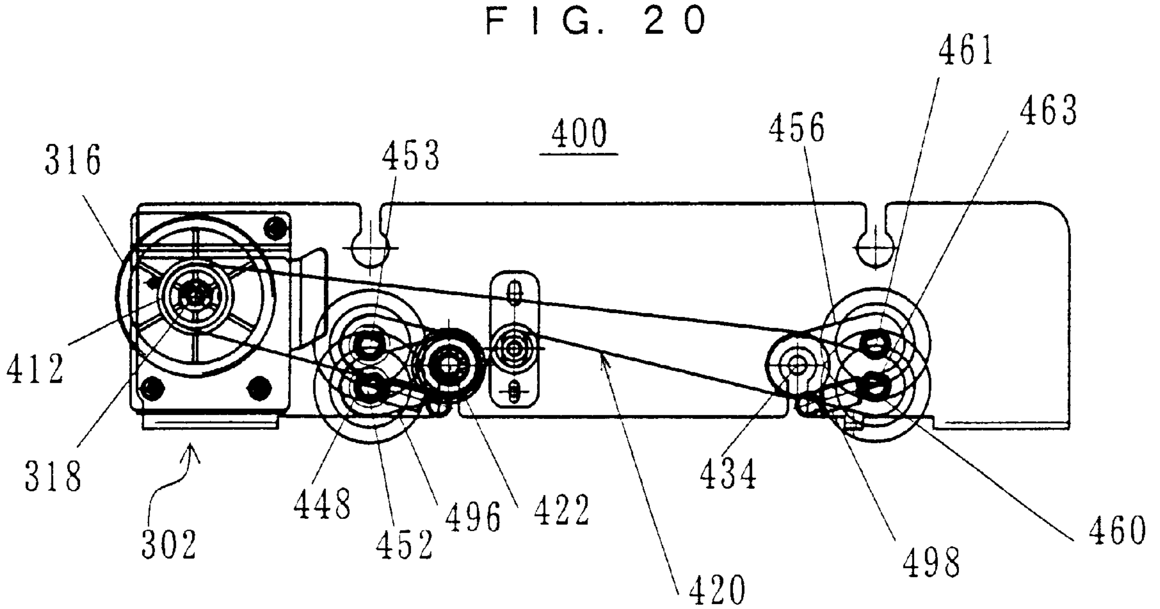
FIG. 20 is an enlarged side view for explaining a movement mechanism of lower feed rollers of the envelope feed system 470 in the carrier unit 400 shown in FIG. 16.
Figure 19:
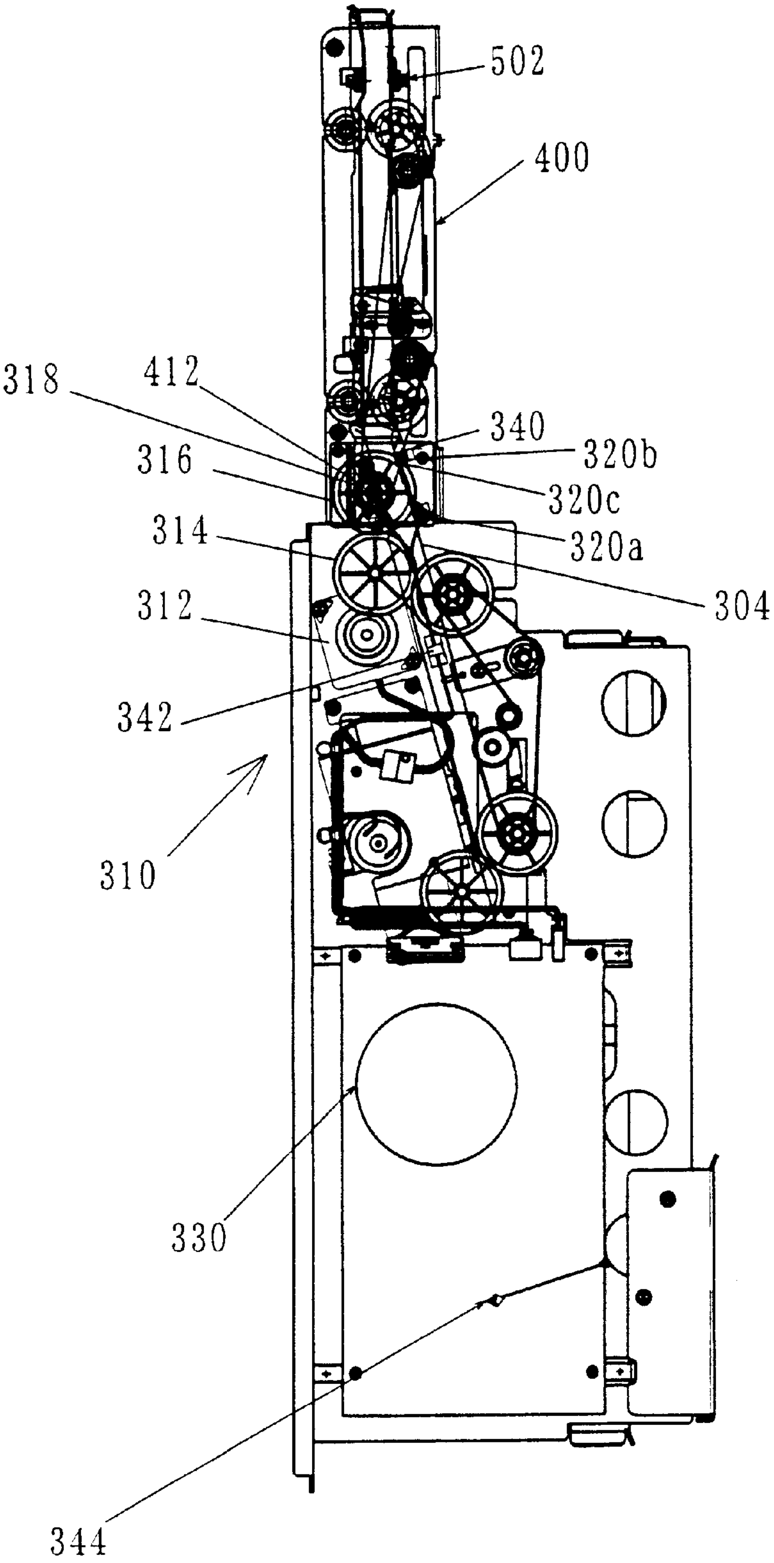
FIG. 19 is a partially sectional view of the envelope detector system 480 of the carrier unit 400 and a printing system of the EDU 300 shown in FIG. 16.

Next follows a description of the EDU 300 and carrier unit 400 in the ATM 1 of the present invention, with reference to FIGS. 16–20. FIG. 16 is a sectional view of an essential part of ATM 1 for explaining an arrangement among the facade 10, EDU 300, and carrier unit 400. FIG. 17 is an enlarged plane view which shows driving system 410 and envelope carrier system 470 in the carrier unit 400. FIG. 18 is an enlarged side view which shows the driving system 410 and the envelope carrier system 470 in the carrier unit 400, and a relationship among them and EDU 300. FIG. 19 is an enlarged sectional view of the envelope detector system 480 of the carrier unit 400 and a printing system of the EDU 300. FIG. 20 is an enlarged side view for explaining a movement mechanism of lower carrier rollers of the envelope carrier system 470 in the carrier unit 400.

The EDU 300 may use any EDU as it is, for example, Fujitsu CA02468-B051. Thus, the configuration of the EDU 300 is well known in the art, and therefore a structure and function of each component in the EDU 300 are simplified and partially omitted in the following description and the accompanying drawings. Each component of the EDU 300 receives instructions from the main controller 2 through the EDU controller 301.

The EDU 300 is an apparatus which stores and administers deposit envelopes 600 inserted from the envelope inlet 22 in the facade 10. The EDU 300 includes, as shown in FIGS. 16 and 19, envelope receiving part 302; envelope drive/feed system 310 having motor 312; stamp wheel 330 which prints letters and other symbols on the envelope 600; various sensors (i.e., length detecting sensor 340, insertion detecting sensor 342, printing sensor 344); and receiving box BIN 350.

The envelope receiving part 302, to which the carrier unit 400 is attached, projects by about 6 inches from the body of the EDU 300 into the wall W. The envelope 600 which has reached the envelope receiving part 302 is then fed by the envelope drive/feed system 310 through the envelope feed path 304 to a printing position where the printing sensor 344 shown in FIG. 19 detects it. When the printing sensor 344 detects the envelope 600, the envelope drive/feed system 310 temporarily stops the feeding of the envelope 600. Then, the stamp wheel 330 prints necessary information on the envelope 600. The printed envelope is stored in the BIN 350 shown in FIG. 16.

The length detecting sensor 304 at the envelope receiving part 302 is used, with the printing sensor 344, as described later, to judge whether the inserted object (which is expected to be the envelope 600) is a regular envelope. If the inserted object is judged to be one other than a regular envelope that is stored in the envelope stock part 26 in the facade 10, it is then returned as an improper insertion from the envelope inlet 22 to the user by reverse feeding by the envelope drive/feed system 310, after the object reached the printing sensor 340.

Without the carrier unit 400, the insertion detecting sensor 342 detects insertion of the envelope, and contributes to drive the motor 312 of the envelope drive/feed system 310. However, with the carrier unit 400, the insertion detecting sensor 502 in the carrier unit 400 represents this function, and the insertion detecting sensor 342 does not function substantially in this embodiment. Optionally, if the carrier unit 400 and the EDU 300 have separate power sources, then the insertion detecting sensor 342 may serve to drive motor 312 when the envelope 600 is inserted. The positions of the insertion detecting sensor 342 and the length detecting sensor 340 may be replaced with each other.

Like the carrier unit 100, the carrier unit 400 enables, when connected to the EDU 300, the facade 10 to he separated from the EDU 300. Since the envelope receiving part 302 of the EDU 300 projects into the wall W by about 6 inches, the carrier unit 4 illustratively has a length of 7 inches or so.

The carrier unit 400 includes a pair of side frames 402, 404; driving system 410; envelope feed system 470; and envelope detector system 500.

The side frames 402, 404 are each made of a metal thin plate having predetermined strength, and fixed at connection parts 402*a*, 404*a*, onto the envelope receiving part 302 of the EDU 300 by attachment screws 320*a*–320*f*, as shown in FIGS. 18–19. Hereupon, the attachment screws 320*a*–320*f* are located at the side of the side frame 404, but omitted in FIGS. 18–19. Thereby, the carrier unit 400 is connected to the envelope 302 of the EDU 300.

The attachment screws 320*a*–320*f* have been used conventionally to get into screw holes (not shown) on the side frames 322 and 324 and secure the side frames 322 and 324 onto the envelope receiving part 302. The side frame 324 is provided at the side of the side frame 404, but omitted in FIGS. 16–20. Like the carrier unit 100, the carrier unit 400 of the present invention uses the attachment means which have existed already in the EDU, and do not require independent fixing means for connection with the EDU. Like the carrier unit 100, means for fixing the side frames 402, 404 is not limited to the above attachment screws. Moreover, like the carrier unit 100, the side frames 402, 404 may have different shapes.

The driving system 410 serves to drive the envelope feed system 470 which will be described later, and includes the driving system 410*a* which drives the upper feed system 470*a* of the envelope feed system 470 and driving system 410*b* which drives the lower feed system 470*b*.

Referring to FIGS. 17–18, the driving system 410*a* for the upper feed system 470*a* is primarily provided on the side frame 404, and further classified into a driving system at the side of the EDU 300 and a driving system at the side of the facade 10.

The driving system 410*a* for the upper feed system 470*a* at the side of the EDU 300 includes roller 414, drive transmission belt 420, drive transmission gears 424, 426, 428 and 430, and shafts 422, 432.

The roller 412 is fixed onto the shaft 318 concentric to drive transmission gear 316 of the EDU 300, and supported on the side frame 322 of the envelope receiving part 302 so that it may rotate with the shaft 318. The drive transmission gear 316 of the EDU 300 is connected to the drive transmission gear 314 which is connected to the motor 312. Therefore, the roller 412 may obtain driving force from the motor through the drive transmission gears 314, 316 and the shaft 318. Hereupon, the shaft 318, the drive transmission gears 314, 316, and the motor 312 are well known in the art as disclosed in Fujitsu CA02468-B051, and a detailed description thereof will be omitted.

The roller 414 is connected to the roller 412 via the drive transmission belt 420. Therefore, when the roller 412 rotates, the roller 414 is driven accordingly. When the roller 414 rotates, the shaft 422 onto which it is secured rotates. The shaft 422 is supported onto the side frames 402, 404 rotatably. The gear 424 is fixed onto the shaft 422 inside the roller 414. The shaft 422 also serves as the driving system 410*b* of the lower feed system 470*b* that will be described later.

The gear 424 is connected to the gear 426 which is located above the gear 424, while the gear 426 is connected to the gear 428 which is located above the gear 426. The gear 428 is connected to the gear 430 which is located above it. These four gears 424, 426, 428 and 430 are each rotatably supported on the side frame 404.

The driving system 410*a* for the upper feed system 470*a* at the side of the facade 10 includes the roller 418, the drive transmission belt 420, drive transmission gears 436, 438, 440 and 442, and shafts 434, 444.

The roller 418 is connected to the roller 412 via the drive transmission belt 420. Therefore, when the roller 412 rotates, the roller 418 is driven accordingly. When the roller 418 rotates, the shaft 434 onto which it is secured rotates. The shaft 434 is supported onto the side frames 402, 404 rotatably. The gear 436 is fixed onto the shaft 434 inside the roller 418. The shaft 434 also serves as the driving system 410*b* of the lower feed system 470*b* that will be described later.

The gear 436 is connected to the gear 438 which is located above the gear 436, while the gear 438 is connected to the gear 440 which is located above the gear 438. The gear 440 is connected to the gear 442 which is located above it. These four gears 436, 438, 440 and 442 are each rotatably supported on the side frame 404.

As a result of such a configuration of the driving system 410*a* for the upper feed system 470*a*, when the roller 412 rotates, the driving force of the motor 312 in the EDU 300 is transmitted to the shaft 432, 444.

Tension roller 416 is provided between the rollers 414 and 418. Like the tension roller 118, the tension roller 416 guides and compresses the drive transmission belt 420, providing the drive transmission belt 420 with predetermined tension. The compression force applied by the tension roller 416 is adjustable similar to that of the tension roller 118.

The driving system 410*b* for the lower feed system 470*b* is also classified into a driving system at the side of the EDU 300 and a driving system at the side of the facade 10.

The driving system 410*b* for the lower feed system 470*b* at the side of the EDU 300 includes, as shown in FIGS. 17–18, shafts 422, 452, rollers 414, 446 and 450, and drive transmission belts 420, 448.

As described above, the shaft 422 constitutes the driving system 410*b* for the lower feed system 470*b* as well as the driving system 410*a* for the upper feed system 470*a*. The roller 446 is fixed at the middle portion of the shaft 422. The roller 446 is connected, via the drive transmission belt 448, to the roller 450 which is fixed at the middle portion of the shaft 452 parallel to the shaft 422. Therefore, when the roller 414 is rotated by the drive transmission belt 420 and consequently the shaft 422 is driven, the driving force is transmitted to the shaft 452.

The driving system 410*b* for the lower feed system 470*b* at the side of facade 10 includes, as shown in FIGS. 17–18, shafts 434, 460, roller 418, 454 and 458, and drive transmission belts 420, 456.

As described above, the shaft 434 constitutes the driving system 410*b* for the lower feed system 470*b* as well as the driving system 410*a* for the upper feed system 470*a*. The roller 454 is fixed at the middle portion of the shaft 434. The roller 454 is connected, via the drive transmission belt 456, to the roller 458 which is fixed at the middle portion of the shaft 446 parallel to the shaft 434. Therefore, when the roller 418 is rotated by the drive transmission belt 420 and consequently the shaft 434 is driven, the driving force is transmitted to the shaft 460.

As a result of such a configuration of the driving system 410*b* for the upper feed system 470*b*, when the roller 412 rotates, the driving force of the motor 312 in the EDU 300 is transmitted to the shaft 452, 460.

As realized by the foregoing, the carrier unit 400 of the present invention obtains power for feeding the envelope 600 from the external EDU 300, similar to the carrier unit 100. Thereby, the number of components can be reduced and the mechanism can be simplified in comparison with the carrier unit having a separate power source. In addition, since control of the motor 312 in the EDU 300 leads to control of movement of the envelope 600, the controller 301 of the EDU 300 may control the carrier unit 400. Of course, optionally, the carrier unit 400 may have a separate power source, such as a motor, and a separate control unit.

Although major drive transmission gears which constitute driving system 410 are provided on the side frame 404, one or both may be optionally provided on the side frame 402. The shafts 422 and 434 may be provided anywhere as far as they do not obstruct the envelope feed path 462 for the envelope 600. Optionally, the gear and the roller are replaced with each other. Moreover, a tension roller may be provided, if necessity arises, on the drive transmission belts 448, 456.

Referring to FIGS. 17, 18 and 20, a description will be given of the envelope feed system 470 in the carrier unit 400 of the present invention. The envelope feed system 470 receives the envelope 600 which has been inserted into the envelope inlet 22 in the facade 10, and feeds the envelope 600 to the envelope receiving part 302 in the EDU 300. In the drawings, reference numerals 470, 470*a* and 470*b* are omitted.

As discussed above, the envelope feed system 470 includes upper feed system 470*a* which makes rollers contact the top surface of the envelope 600 so as to guide and feed the envelope 600 while compressing it; and lower feed system 470*b* which makes rollers contact the bottom surface of the envelope 600 so as to guide and feed the envelope 600 while compressing it. The upper and lower feed system 470*a* and 470*b* are each further classified into a feed system at the side of the EDU 300 and a feed system at the side of the facade 10. In this way, unlike the carrier unit 100 which feeds the bills 41 by using the bill feed belts, the carrier unit 400 uses rollers to feed the envelope 600.

The envelope 600 is longer in the feed direction and less subject to crease than the bill 41. In addition, only one envelope 600 is inserted. Therefore, a belt for feeding the envelope is not provided so as to reduce the number of components in the carrier unit 400 and the EDU 300.

In this way, the envelope feed path 426 through which the envelope 600 is fed from the envelope inlet 22 in the facade 10 to the envelope receiving part 302 of the EDU 300 is defined by guides 488, 490, 492 and 494. The envelope feed path 426 includes contact surfaces between the feed rollers 472, 474, 476 and 478 of the upper feed system 470*a* and the feed rollers 480, 482, 484 and 486 of the lower feed system 470*b*. The envelope feed path 426 is connected to the envelope feed path 304 in the EDU 300.

The envelope feed path 462 may be level or slant slightly from the envelop receiving part 401 to the EDU 300. Optionally, in order to increase a slanted angle of the envelope feed path 462, the shape of the carrier unit 400 may be changed so that the envelope receiving part 401 may be higher than the envelope receiving part 302 of the EDU 300.

As shown in FIGS. 17–18, the upper feed system 470*a* includes, at the side of the EDU 300, shaft 432, and a pair of feed rollers 472, 474 at approximately middle portions of the shaft 432, and includes, at the side of the facade 10, shaft 444, and a pair of feed rollers 476, 478 at approximately middle portions of the shaft 432. No adjustment rollers are provided since the envelope 600 has less subject to crease than a plurality of piled bills.

The shafts 432 and 444 are fixed onto the frames 402 and 404, and do not move. The feed roller 472 corresponds to feed roller 480 which will be described later, while the feed roller 474 corresponds to feed roller 482 which will be described later. The feed roller 476 corresponds to feed roller 484 which will be described later, while the feed roller 478 corresponds to feed roller 486 which will be described later.

The guides 488 and 492 assist the envelope 600 in being fed. The guides 488 and 492 may be connected to the shaft 444.

As a result of such a configuration of the upper feed system 470*a,* when the shafts 432, 444 are driven, the feed rollers 472, 474, 476 and 478 rotate accordingly.

As shown in FIGS. 17–18, the lower feed system 470*b* includes, at the side of the EDU 300, shaft 452, and a pair of feed rollers 480, 482 at approximately middle portions of the shaft 452, and includes, at the side of the facade 10, shaft 460, and a pair of feed rollers 484, 486 at approximately middle portions of the shaft 460. As understood from FIG. 18, the feed rollers 480, 482, 484 and 486 each have a larger diameter than the corresponding feed rollers 472, 474, 746 and 478. However, optionally, a diameter of the upper roller may be made equal to or larger than that of the lower feed roller.

The shaft 452, 460 are supported movably relative to the shaft 432, 444 between the frames 402 and 404. Therefore, the carrier unit 400 may accept a thick envelope. As shown in FIG. 20, the shaft 452 is forced upwardly (or towards the envelope feed path 462) by compression spring 496, but rotatable around shaft 422 via levers 453, 455 between positions 453 and 455. One end of the compression spring 496 is engaged with the shaft 452, and the other end of it is engaged with a shaft (not shown) fixed onto the side frames 402, 404 under the shaft 422. Similarly, the shaft 460 is forced upwardly (or towards the envelope feed path 462) by compression spring 498, but rotatable around shaft 434 via levers 475, 477 between positions 461 and 463. One end of the compression spring 498 is engaged with the shaft 460, and the other end of it is engaged with a shaft (not shown) fixed onto the side frames 402, 404 under the shaft 434. The compression spring 498 may be replaced with a tension spring and a position of its other end may be changed accordingly.

The guides 490, 494 corresponding to guides 488, 482 assist the envelop 600 in being fed. These guides 488 and 482 may be connected to the shaft 460.

As a result of such a configuration of the lower feed system 470*b,* when the shaft 452, 460 are driven, the feed rollers 480, 482, 484 and 486 rotate accordingly.

Referring to FIG. 19, a description will now be given of the envelope detector system 500 of the carrier unit 400 of the present invention. The envelope detector system 500 is located at the envelope receiving part 401, and comprised of insertion detecting sensor 502 which detect the insertion when an object is inserted into the envelope inlet 22 in the facade 10. As an example, the sensor 502 is comprised of a photo sensor similar to sensor 252. The sensor 502 is connected to the controller 301 of the EDU 300 and the main controller 2. When the envelope 600 intercepts the communication channel of the photo sensor, the sensor 502 detects the insertion of the envelope and transmits the detection signal to the controller 301 and the main controller 2.

The insertion detecting sensor 502 is used together with the length detecting sensor 340 to check whether the inserted object is the regular envelope that is stored in the envelope stock part 26 in the facade 10.

Figure 21A:
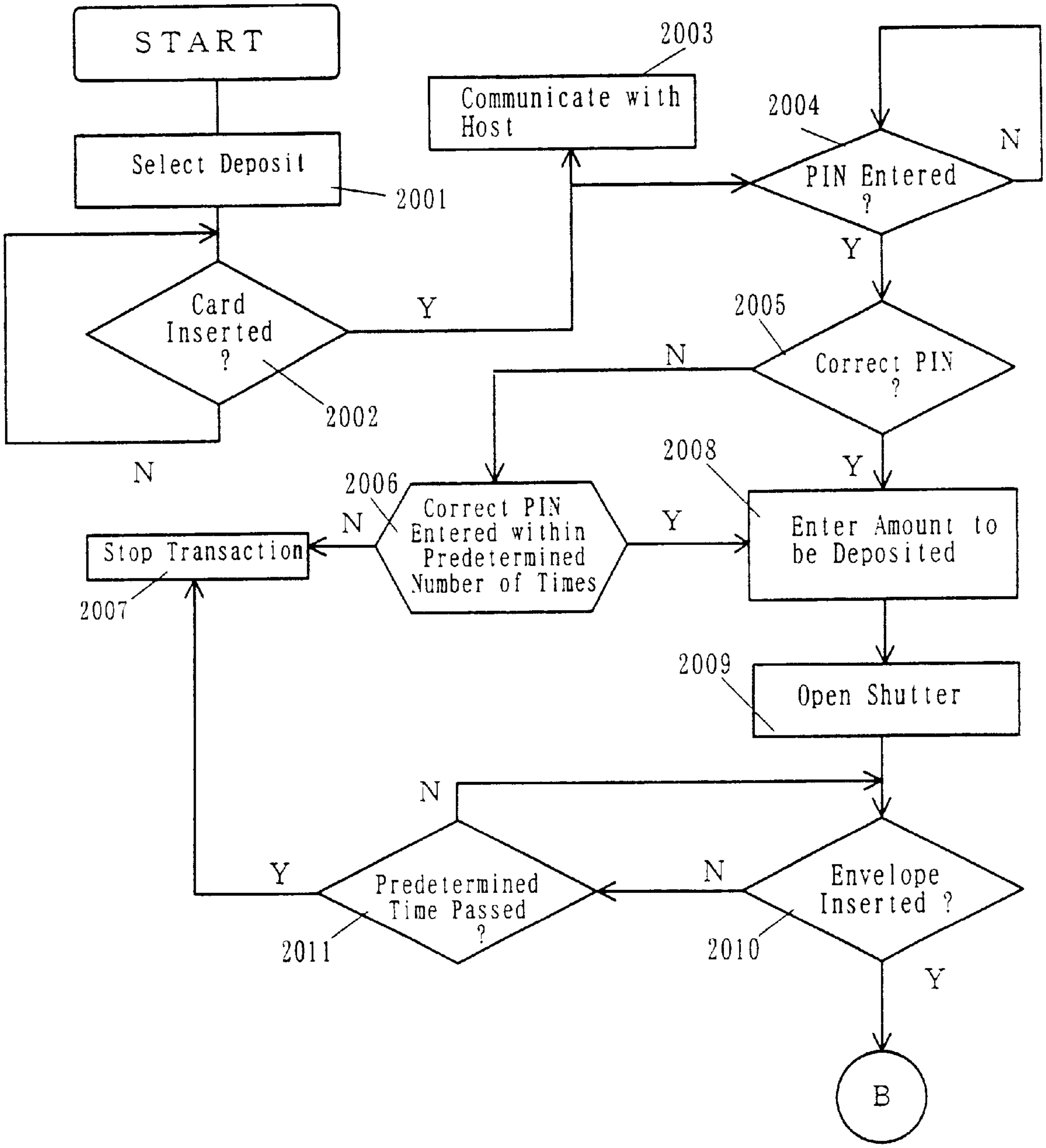
FIGS. 21A and 21B are flowcharts of a deposit operation of the ATM 1 according to the present invention shown in FIG. 1.
Figure 21B:
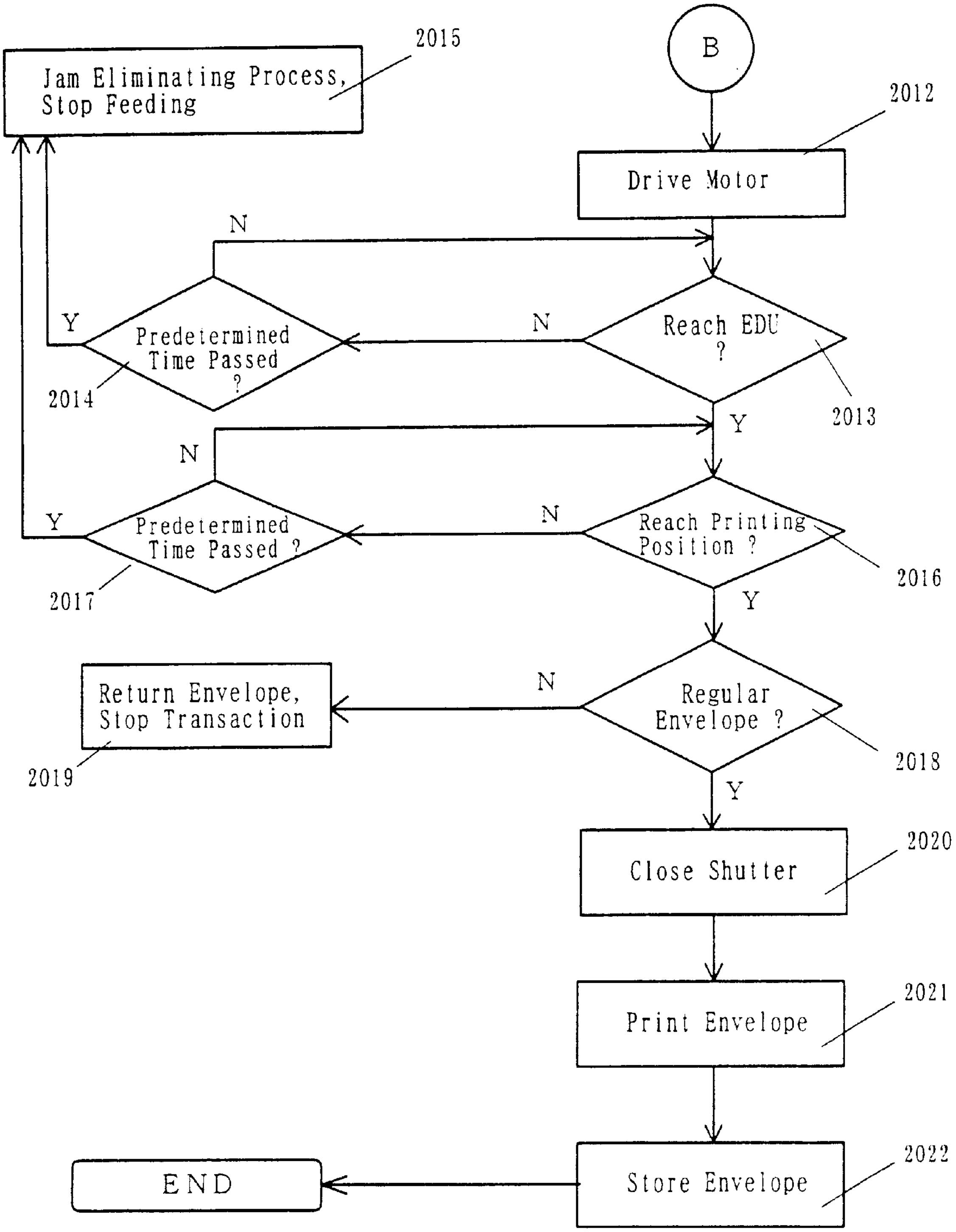

A description will be given of the deposit action of the through-the-wall ATM 1 of the present invention with reference to FIGS. 21A and 21B.

First, a user selects the deposit transaction (deposit) operating the function keys 14 in accordance with the guidance of the operation screen 12 on the facade 10 (step 2001). In response, the operation screen 12 requires the user to insert his/her card, and the user inserts the card into the card inlet 18 (step 2002).

The inserted card is fed to the CRU (not shown), and the CRU reads out the information recorded on the magnetic stripe. Based on the information, the main controller 2 starts via the communication part 3, a communication with the host computer in the financial institution that issued the card (step 2003).

The user then enters his/her PIN in accordance with the guidance of the operation screen 12 (step 2004). In general, the order of the steps 2001 and 2002 may be changed. The main controller 2 may transmit the entered PIN to the host computer and request the verification or obtain user's PIN data from the ledger of the host computer and verifies it by itself.

Unlike the withdrawal transaction, the PIN is verified first in this embodiment. Therefore, if the PIN entered at the step 2004 is not correct (step 2005), the transaction is terminated (step 2007) unless the correct PIN is entered within the predetermined number of times (step 2006). If the correct PIN is entered (steps 2005, 2006), the operation screen 12 requires the user to enter the deposit amount put in the envelope 600 (step 2008). Since the ATM 1 cannot check the deposit amount put in the envelope 600, the ATM 1 simply records this input.

When the deposit amount is entered, the main controller 2 instructs the facade 10 to open the shutter 23 (step 2009), and awaits an insertion of the envelope 600 by the user. If the user does not insert the envelope 600 within a predetermined period of time (step 2011), the transaction is terminated (step 2007).

When the user inserts the envelope 600 into the envelope inlet 22 (step 2010), the carrier unit 400 takes in the envelope 600 from the envelope receiving part 401. First, the insertion detecting sensor 502 at the envelope receiving part 401 of the carrier unit 400 detects the envelope 600, and informs the main controller 2 and the controller 301 of the EDU 300 of the detection result.

In response, the controller 301 of the EDU 300 drives the motor 312 directly or in accordance with an instruction by the main controller 2 (step 2012). The main controller 2 (and/or the controller 301) starts a timer (not shown) in response to the detecting signal of the insertion detecting sensor 502. The timer is connected to a comparator (not shown).

A description will now be given of an operation of each component in the carrier unit 400.

When the motor 312 is driven, the roller 412 rotates via the drive transmission gears 314, 316 and the shaft 318. Thereby, the drive transmission belt 420 rotates to drive the rollers 414, 418 under the predetermined tension by the tension roller 422.

When the roller 414 rotates, the shaft 422 rotates accordingly and the shaft 432 is rotated via the drive transmission gears 424, 426, 428 and 430. When the roller 418 rotates, the shaft 434 rotates accordingly and the shaft 444 is rotated via the drive transmission gears 436, 438, 440 and 442. Thereby, the feed roller 472, 474, 476 and 478 of the upper feed system 470*a* are driven.

On the other hand, the shaft 422 drives the shaft 452 via the roller 446, 450 and the drive transmission belt 448. The shaft 434 drives the shaft 460 via the rollers 454, 458 and the drive transmission belt 456. Thereby the feed rollers 480, 482, 484 and 486 of the lower feed system 470*b* are driven.

In this way, the feed rollers are rotated so that the envelope 600 is fed in the envelope feed path 462 in the envelope feeding direction D. These rollers rotate together since they are compressed against each other, preventing such a situation where the upper feed rollers rotate faster than the lower feed rollers.

The inserted envelope 600 is taken into the carrier unit 400 by the feed rollers 476, 478, 484 and 486 while guided by the guides 488, 490. Next, the top of the envelope 600 reaches the feed rollers 472, 474, 480 and 482, and is then passed to the envelope receiving part 302 of the EDU 300.

When the envelope 600 reaches the length detecting sensor 340 in the EDU 300, the detection signal is sent as a detection result to the main controller 2 and/or the controller 301 of the EDU 300.

On the other hand, no message from the length detecting sensor 340 within a predetermined period that the timer of the main controller 2 and/or the controller 301 in the EDU 300 measures, means that the envelope 600 does not reach the EDU 300 (steps 2013, 2014). Then, the main controller 2 considers that a jamming takes place in the carrier unit 400, stops feeding, instructs the controller 301 in the EDU 300 to transfer to the jam eliminating process.

When the length detecting sensor 340 sends a message within the predetermined period, the main controller 2 obtains from the timer the time when it received the message.

Then, the envelope 600 is fed to the printing position and detected by the printing sensor 344 (step 2016). The detection signal of the printing sensor 344 is sent to the main controller 2 and/or the controller 301. The time when the detection signal of the printing sensor 344 is received may be obtained from the above timer. A time difference between the time when the detection signal from the printing sensor 344 is received and the time when the detection signal from the length detecting sensor 340 is received may provide a feeding period of the envelope 600 from the length detecting sensor 340 to the printing sensor 344. A circuit configuration may be easily designed to obtain such a feeding period by using the comparator.

The feeding period is sent to the comparator connected to the above timer, and compared with the reference time that has been entered previously. The reference time is set to be the time that is usually necessary for the carrier unit 400 to feed the regular envelope. If the feeding period is approximately equal to the reference time, the main controller 2 regards the envelope 600 as a regular envelope that is stored in the envelope stock part 26 in the facade 10. On the other hand, if the length detecting sensor 340 and the printing sensor 344 simultaneously detect the envelope or the feeding period is shorter than the reference time, then the main controller 2 would consider that the envelop 600 is longer than the regular envelope. If the feeding period is longer than the reference time, the main controller 2 considers that the envelope 600 is shorter than the regular envelope, for instance.

On the other hand, if the main controller does not receive the message from the printing sensor 340 within the predetermined period of time (step 2017), the main controller 2 considers that a jam took place in the carrier unit 400, stops feeding, and instructs the controller 301 of the BDU 300 to transfer the jam eliminating process (step 2015).

If the main controller 2 and/or the controller 301 receives the detection signal from the printing sensor within the predetermined period of time, then the controller 301 instructs the envelope drive/feed system 310 to stop the motor directly or in accordance with the instruction by the main controller 2.

If the main controller 2 judges the envelope 600 not to be the regular envelope (step 2018), then the main controller 2 instructs the controller 301 to return the envelope 600 from the printing sensor. In response, the controller 301 drives the envelope drive/feed system 310 in the reverse direction, thereby returning the envelope 600 to the envelope inlet 22 in the facade 10 along the envelope feed path 462, and then terminates the transaction (step 1019). Optionally, the operation screen 12 may indicate a guidance that requires the user to use the regular envelope, and repeat the procedures from the step 2010.

If the main controller 2 judges that the envelope 600 to be the regular envelope, the main controller 2 instructs the facade 10 to close the shutter 23 (step 2020). Then the stamp wheel 330 prints necessary information on the envelope 600 (step 2021). Then, the envelope drive/feed system 310 feeds the envelope 600 to the BIN 350, and stores the envelope there (step 2022).

Since the return of the card and issue of the receipt are the same as the conventional way, a description thereof will be omitted.

In this embodiment, the length of the envelope 600 is detected by the detection signals from the length detecting sensor 340 and the printing sensor 344, but it may be detected by the insertion detecting sensor 502 and length detecting sensor 340 and/or the printing sensor 344. That is, comparison of the feeding period of the envelope 600 in the carrier unit 400 with the predetermined reference time detects not only whether there is a jamming in the carrier unit 400 but also whether the envelope 600 is a regular envelop. If the insertion detecting sensor 502 and the length detecting sensor 304 judge the appropriateness of the envelope 600, the length detecting sensor 340 temporarily stops driving the envelope drive/feed system 310 so as to return from the length detecting sensor 340 the envelope 600 that is not a regular envelope.

Although the preferred embodiments of the present invention have been described, the present invention is not limited to these embodiment, needless to say, and various variations and modifications may be made without departing from the scope of the present invention. For example, the carrier units 100 and 400 according to the present invention may be connected to the facade 10, instead of the BDU 32 and EDU 300. In addition, applications of the present invention are not limited to the BDU and EDU, but a BRU and a feeding of a transfer card for transferring money.

Moreover, the present invention is not limited to the through-the-wall ATM, but applicable to a general automatic transaction system which requires to carry a transaction medium from a processing part in accordance with transaction information entered at an input part to a location which is located apart from the processing part, or to carry the transaction medium from the input part to the processing part. In that case, the fed location of the transaction medium is not limited to the input part as far as the input part and the processing part are connected to each other electrically, optically, or by other means. Of course, a cause of separation is not limited to an intermediate wall.

The carrier unit body may be made of a plurality of removable similar unit blocks. Thus, the present invention may provide a carrier unit which appropriately corresponds to the thickness of the wall by changing the number of blocks included in the carrier unit depending upon the thickness of the wall.

What is claimed is:

1. A carrier unit comprising:

a transaction medium receiving part which receives a transaction medium from a dispensing part of a processing unit in an automatic transaction system, the processing unit including the dispensing part and a processing part, the automatic transaction system including the processing unit and an input that is located outside the processing unit, the dispensing part being apart from the input part and dispensing under control by the processing part the transaction medium outside the processing unit in accordance with transaction information entered from the input part;

a feed system including upper and lower feed systems, which feed the transaction medium by holding a top and bottom of the transaction medium, and are able to be spaced relative to each other from the dispensing part of the processing unit, outside the processing unit, to a predetermined location apart from the dispensing part by a predetermined distance; and a driving system which drives said feed system and is supplied with driving force from the automatic transaction system, wherein said driving system includes;

a drive transmission belt which receives the driving force from the automatic transaction system; and a shaft connected to said drive transmission belt, and wherein said feed system includes a roller fixed onto said shaft.

2. A carrier unit according to claim 1 wherein the input part of the automatic transaction system is located at the predetermined location, and said feed system feeds the transaction medium from the dispensing part to the input part in the automatic transaction system.

3. A carrier unit according to claim 1, wherein said feed system includes a holding member which holds the transaction medium at the predetermined location.

4. A carrier unit according to claim 1, wherein said feed system includes an adjustment roller which aligns the transaction medium being fed at the predetermined location.

5. A carrier unit according to claim 1, wherein said feed system includes:

at least two or more rollers; and a feed belt passed around said rollers.

6. A carrier unit according to claim 1, further comprising a driving system which drives said feed system and is supplied with driving force from the automatic transaction system, wherein said driving system includes:

a first drive transmission belt which receives the driving force from the automatic transaction system;

a first shaft connected to said first drive transmission belt and the upper feed system of said feed system;

a second shaft connected to the lower feed system of said feed system; and a second drive transmission belt which connects said first shaft and said second shaft to each other.

7. A carrier unit comprising:

a transaction medium receiving part which receives a transaction medium from an input part of an automatic transaction system including a processing unit and the input part that is located outside the processing unit, the processing unit including a processing part and an entry part, said entry part being located apart from the input part, the processing part conducting a predetermined process for the transaction medium entered from the input part through the entry part;

a feed system including upper and lower feed systems which feed the transaction medium by holding a top and bottom of the transaction medium and are able to be spaced relative to each other from the input part to the entry part of the processing unit in the automatic transaction system; and a driving system which drives said feed system and is supplied with driving force from the automatic transaction system, wherein said driving system includes:

a first transmission belt which receives the driving force from the automatic transaction system;

a first shaft connected to said first drive transmission belt;

a second shaft connected to said first shaft and the upper feed system of said feed system; and a third shaft which is connected to said first shaft and the lower feed system of said feed system and rotatable around said first shaft.

8. A carrier unit according to claim 7, wherein said feed system includes upper and lower feed systems which feeds the transaction medium by holding a top and bottom of the transaction medium and are able to be spaced relative to each other, and wherein said carrier unit further comprises a driving system which drives said feed system and is supplied with driving force from the automatic transaction system, and wherein said driving system includes:

a first transmission belt which receives the driving force from the automatic transaction system;

a first shaft connected to said first drive transmission belt;

a second shaft connected to said first shaft and the upper feed system of said feed system; and a third shaft which is connected to said first shaft and the lower feed system of said feed system and rotatable around said first shaft.

9. An automatic transaction system comprising:

an input part which enters transaction information and receives transaction medium in accordance with the transaction information;

a processing unit which processes the transaction information and dispenses the transaction medium, said processing unit being located outside said input part and including a dispensing part to dispense the transaction medium outside the processing unit; and a carrier unit which is connected to said dispensing part of said processing unit and includes a feed system including upper and lower feed systems which feed the transaction medium by holding a top and bottom of the transaction medium and are able to be spaced relative to each other from said dispensing part to said input part, enabling said input part to be located apart from said dispensing part, wherein said carrier unit comprising a driving system which drives said feed system and is supplied with driving force from the automatic transaction system, wherein said driving system includes:

a drive transmission belt which receives the driving force from the automatic transaction system; and a shaft connected to said drive transmission belt, and wherein said feed system includes a roller fixed onto said shaft.

10. A carrier control method for feeding a transaction medium from a dispensing part of a processing unit to an input part via a carrier unit in an automatic transaction system which includes the input part, the processing unit apart from and outside the input part, and the carrier unit, wherein the carrier unit includes a fees system including upper and lower feed systems which feed the transaction medium by holding a top and bottom of the transaction medium and are able to be spaced relative to each other, from the dispensing part of the processing unit, outside the processing unit, to a predetermined location apart from the dispensing part by a predetermined distance, and a driving system which drives the feed system and is supplied with driving force from the automatic transaction system, wherein the driving system includes a drive transmission belt which receives the driving force from the automatic transaction system, and a shaft connected to the drive transmission belt and wherein the feed system includes a roller fixed onto the shaft, the processing unit including a processing part and the dispensing part that is apart from the input part, the transaction medium to be dispensed by the dispensing part being determined by the processing part based on transaction information entered from the input part, said method comprising the steps of:

driving the carrier unit so as to send out the transaction medium from dispensing part of the processing unit to the carrier unit;

measuring a feeding period of time for which the carrier unit feeds the transaction medium;

comparing the feeding period of time with reference time; and controlling driving of the carrier unit based on a result of said comparing step.

11. A carrier control method according to claim 10, wherein said controlling step includes the steps of:

detecting whether the transaction medium reaches the input part;

continuing to drive the carrier unit even though said detecting step judges that the transaction medium has not yet reached the input part if said comparing step judges that the feeding period of time has not yet reached the reference time; and terminating driving of the carrier unit, if said detecting step judges that the transaction medium has not yet reached the input part, and if said comparing step judges that the feeding period of time has reached the reference time.

12. A carrier control method for feeding a transaction medium entered by an input part from the input to an entry part via a carrier unit in an automatic transaction system which includes the input part, the carrier unit, and a processing unit that conducts a predetermined process for the transaction medium and includes the entry part apart from the input part that is located outside the processing unit, wherein the carrier unit includes a feed system including upper and lower feed systems which feed the transaction medium by holding a top and bottom of the transaction medium and are able to be spaced relative to each other, from the dispensing part of the processing unit, outside the processing unit, to a predetermined location apart from the dispensing part by a predetermined distance, and a driving system which drives the feed system and is supplied with a driving force from the automatic transaction system, wherein the driving system includes a drive transmission belt which receives the driving force from the automatic transaction system, and a shaft connected to the drive transmission belt and wherein the feed system includes a roller fixed onto the shaft, said method comprising the steps of:

driving the carrier unit so as to send out the transaction medium from the input part to the carrier unit;

measuring a feeding period of time for which the carrier unit feeds the transaction medium;

comparing the feeding period of time with reference time; and controlling driving of the carrier unit based on a result of said comparing step.

* * * * *